United States Patent
Shinkai

(10) Patent No.: US 7,680,846 B2
(45) Date of Patent: Mar. 16, 2010

(54) FILE MANAGEMENT PROGRAM, FILE MANAGEMENT APPARATUS AND FILE MANAGEMENT METHOD

(75) Inventor: Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 11/344,162

(22) Filed: Feb. 1, 2006

(65) Prior Publication Data

US 2007/0038689 A1  Feb. 15, 2007

(30) Foreign Application Priority Data

Aug. 3, 2005  (JP)  ............... 2005-225442

(51) Int. Cl.
  *G06F 12/00* (2006.01)
  *G06F 17/30* (2006.01)
(52) U.S. Cl. .................................. 707/205
(58) Field of Classification Search ........... 707/200, 707/10, 205
  See application file for complete search history.

(56) References Cited

U.S. PATENT DOCUMENTS

| | | | |
|---|---|---|---|
| 5,588,147 A | | 12/1996 | Neeman et al. |
| 2003/0069902 A1* | | 4/2003 | Narang et al. ............... 707/203 |
| 2004/0205152 A1 | | 10/2004 | Yasuda et al. |
| 2004/0267758 A1* | | 12/2004 | Katsurashima ............... 707/10 |
| 2004/0267830 A1* | | 12/2004 | Wong et al. ............... 707/200 |

FOREIGN PATENT DOCUMENTS

| | | |
|---|---|---|
| JP | 05-210555 | 8/1993 |
| JP | 7-219830 | 8/1995 |
| JP | 07-219830 | 8/1995 |
| JP | 2002-149466 | 5/2002 |
| JP | 2004-139217 | 5/2004 |
| JP | 2004-252957 | 9/2004 |

OTHER PUBLICATIONS

Japanese Office Action mailed Apr. 7, 2009 in corresponding Japanese Application No. 2005-225442 (4pages) (3 pages English translation).
Iinum Tetsuya, et al. "Cluster System for High-Speed Database Takeover," Toshiba Review, Japan, Toshiba Corporation, Jul. 1, 2002, vol. 57; No. 7, p. 43-46.

* cited by examiner

*Primary Examiner*—Yicun Wu
*Assistant Examiner*—Alexey Shmatov

(57) ABSTRACT

A file management program, a file management apparatus, and a file management method are provided which are capable of migrating files between different file systems while an application program is being run.

File information of source files on a source file system is acquired and recorded as a file information event, and information of file operations made for the source files are acquired and recorded as a file operation event. Based on the file information event and file operation event, a namespace replication database is generated in which the namespace of the source files has been replicated logically.

7 Claims, 9 Drawing Sheets

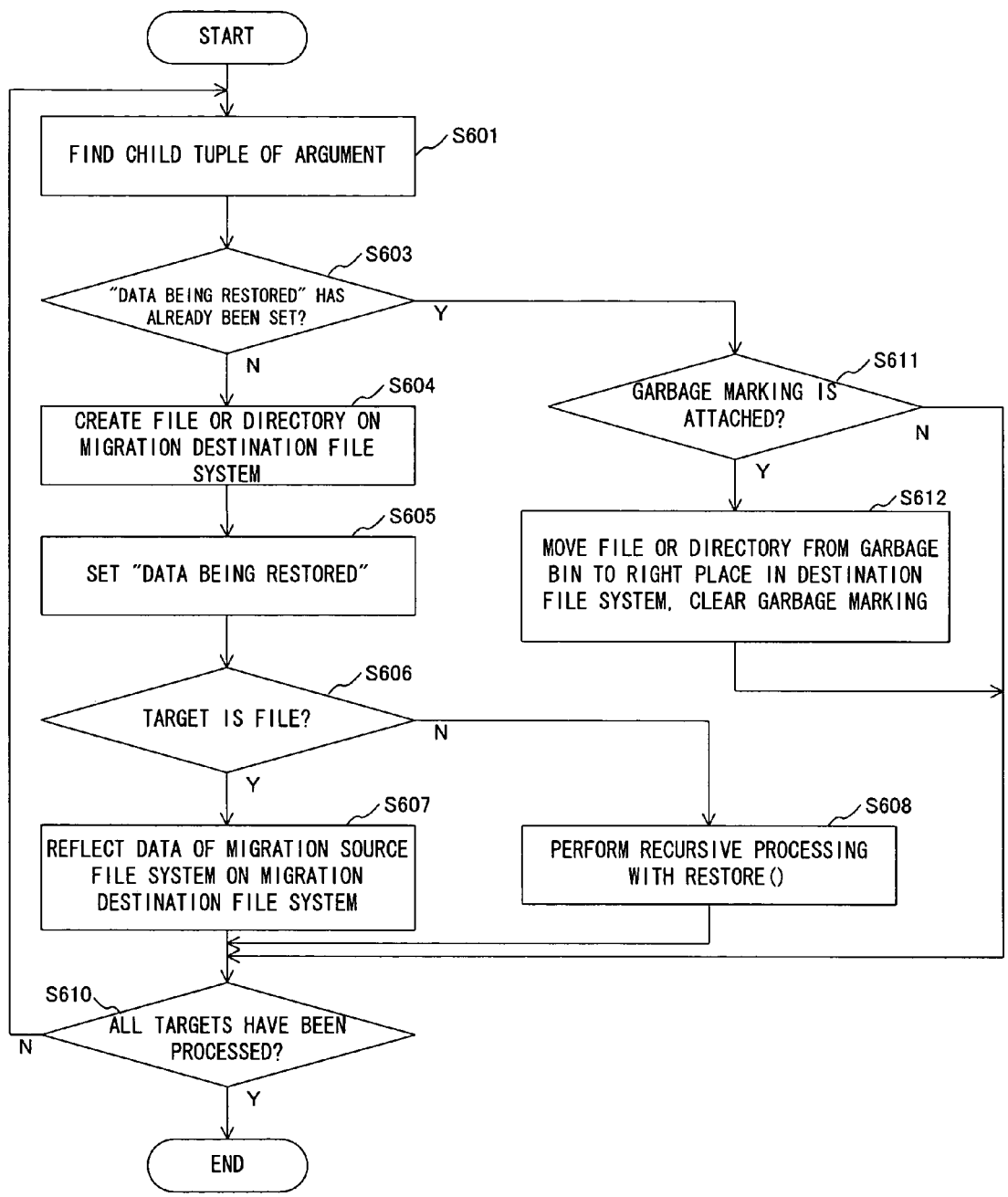

FILE MANAGEMENT PROGRAM, FILE MANAGEMENT APPARATUS AND FILE MANAGEMENT METHOD

BACKGROUND OF THE INVENTION

1. Field of the Invention

The present invention relates to a file management program stored on a computer readable medium, a file management apparatus, and a file management method that manages a file and its namespace during system operation time.

2. Description of the Related Art

In a file management apparatus, a unit of data viewed from an application program is represented as a file. The file is stored in a container called a file system constituted by a plurality of storage device together with hierarchical namespace information so as to be managed. However, at which location in which storage device the file data is to be stored is determined by a file system program in units of the container, making it difficult to control load across the different file systems. For example, assuming that there are a file system A and file system B and the load on the file system B is constantly very low and that on the file system A is constantly very high, it is necessary to select some files in the file system A and migrate them from the file system A to file system B.

As a conventional art related to the present invention, Patent Document 1 (Jpn. Pat. Appln. Laid-Open Publication No. 7-219830) is known. A replication facility in the Patent Document 1 replicates a file sub-tree in one computer system to another.

However, in the conventional file management apparatus, data migration cannot be performed in an application transparent manner, so that an operator must perform the following operations by hand, and work must be suspended until the operations have been completed.

1. Terminate application programs that access files on file system A.
2. Manually move necessary files from file system A to file system B.
3. After completion of the file movement, provide a link from file system A to file system B and set such that an access made from an application program to migrated files on file system A is switched to a destination file on file system B.
4. At time point when a sequence of all the above operations has been completed, restart the application program and resume work.

As described above, it has been very difficult to dynamically balance the load among different file systems in the conventional file management system. Therefore, in order to eliminate unbalance of the load between the different file systems in the conventional file management system, the application program must be suspended for a long time period. This is also a problem in a file server called "NAS" (Network Attached Storage) and result in a problem called "NAS Island" that disallow users to manage and utilize all NAS devices that customers hold as a whole.

Further, the same problem occurs when one file system is to be migrated to a new one. Thus, the above problem, including a problem in which data migration cannot be performed without affecting application or data cannot be partially migrated, makes it difficult to deploy a new file system or to alter the configuration of an existing file system.

The essential reason why it is difficult to migrate a part of data on one file system to a different file system partially while an application program is being run, is that adapting to a modification of namespace made during the data migration is difficult. Unless the application is terminated, a modification made by it on a migration source may cause the some portion of files to be overlooked inadvertently.

Further, in case of a file server like NAS, shared among a plurality of servers, it is difficult to predict the order in which namespace update operations issued nearly simultaneously from different servers, arrive at the NAS and, therefore, it is difficult to identify the order in which the namespace update operations are processed. This further makes it difficult to adapt to a change of namespace present during the migration processing.

In order to solve the above problem, there can be employed a method that provide a gateway device between the NAS devices and servers (NAS clients) that access the NAS devices, and allow the gateway device to intercept requests issued from the NAS clients and to route them to the lower layer NAS devices. In this method, however, it is necessary to provide an extra gateway device, resulting in an increase in cost and a "file handle problem" where the number of conversion tables increases consistently, as the gateway device is not informed when the NAS clients discard the old file handles, then they will never be discarded.

SUMMARY OF THE INVENTION

The present invention has been made to solve the above problem, and an objective thereof is to provide a file management program stored on a computer readable medium, a file management apparatus, and a file management method capable of migrating files between different file systems while an application program is being run.

To solve the above problem, according to a first aspect of the present invention, there is provided a file management program allowing a computer to manage files on a plurality of file systems, the program allowing the computer to execute: a file information retrieve step that acquires the file information of source files on the source file system and records the acquired file information as a file information event; a file operation trace step that acquires the information of file operation made for the source files and records it as a file operation event; and a namespace replication step that generates, based on the file information event and file operation event, a namespace replication database in which the namespace of the source files has been replicated logically.

Further, the file management program according to the present invention allows the computer to further execute, after the namespace replication step, a file data replication step that creates directories on destination file system using the information stored on the namespace replication database and replicates data of the source files on the source file system to the destination file system.

Further, the file management program according to the present invention allows the computer to further execute, after the file data replication step, a file system switch step that enables a switch which routes an access request for a source files on the source file system to the destination file system.

Further, in the file management program according to the present invention, the file information retrieve step follows a hierarchical structure of a directory on the source file system in the ascending or descending order in terms of path name and records file information including the file name and attribute of the source files.

Further, in the file management program according to the present invention, the namespace replication step determines the actual sequence among the file information events and file operation events and reflects the content of the succeeding file operation event on the content of the file information event according to the determined occurrence order to thereby generate the namespace replication database.

Further, in the file management program according to the present invention, in the case where the common information acquisition time of the file information event and file operation event cannot be acquired from the source file system, the file information retrieve step or file operation trace step sets the information acquisition time field in the event to the current time, and the namespace replication step determines the right sequence of given two events, using a pre-defined maximum possible time lag, in which an event having a maximum possible time lag, smaller information acquisition time than the counterpart is deemed to precede the other.

Further, in the file management program according to the present invention, in the case where the exact sequence of multiple events, that is file information events and file operation events, cannot be determined, the namespace replication step register a file or directory that is likely to have been created as a candidate in the namespace replication database, determines existence of the candidate based on the following file information event and file operation event, in which in the case where existence or nonexistence of the candidate has been determined, the namespace replication step adjust the data in the namespace replication database; whereas in the case where the existence of the candidate has not been determined until the end of namespace replication step, the namespace replication step finally inquires of the source file system for the presence of the candidate and adjust the replication database based on the reply.

Further, in the file management program according to the present invention, the file data replication step reflects unprocessed file operation events on the destination file system and provides an instruction for performing a file system switch step when the amount of the unprocessed file operation events becomes less than a predetermined amount.

Further, in the file management program according to the present invention, the file system switch step blocks a file access to the source file system, and reflects unprocessed file operation events on the destination file system, sets link information that points the destination file system in the source file system, then unblocks and resumes the file access.

According to a second aspect of the present invention, there is provided a file management apparatus that manages files on a plurality of file systems, comprising: a file information retrieve section that acquires the file information of source files on source file system and records the acquired file information as a file information event; a file operation trace section that acquires the information of file operation made for the source files and records the acquired the information of file operation issued to the source file system as a file operation event; and a namespace replication section that generates, based on the file information event and file operation event, a namespace replication database in which the namespace of the source files has been replicated logically.

Further, the file management apparatus according to the present invention comprises a file data replication section that sets a directory on destination file system based on the namespace replication database and replicates data of the source files from the source file system to destination file system.

Further, the file management apparatus according to the present invention comprises a file system switch section that switches an access made to the source files on the source file system to an access made to the source files on the destination file system.

Further, in the file management apparatus according to the present invention, the file information retrieve section follows a hierarchical structure of a directory on the source file system in the ascending or descending order in terms of path name and records file information including the name and attribute of the source files.

Further, in the file management apparatus according to the present invention, the namespace replication section determines the actual sequence among the file information events and file operation events and reflects the content of the succeeding file operation event on the content of the file information event according to the determined occurrence order to thereby generate the namespace replication database.

Further, in the file management apparatus according to the present invention, in the case where the common information acquisition time of the file information event and file operation event, that specifies exact sequence among multiple events, cannot be acquired from the source file system, the file information retrieve section or file operation trace section sets the information acquisition time field in the event to the current time, and the namespace replication section estimates the right sequence of given two events, using a pre-defined maximum possible time lag, in which an event having a maximum possible time lag smaller information acquisition time than the counterpart, is deemed to precede the other.

Further, in the file management apparatus according to the present invention, the file data replication section reflects unprocessed file operation events on the destination file system and invokes the file system switch section when the amount of the unprocessed file operation events becomes less than a predetermined amount.

Further, in the file management apparatus according to the present invention, the file system switch section blocks a file access, reflects unprocessed file operation events on the destination file system, sets link information to the destination file system, and cancels the file access suspension after completion of file system switch.

According to a third aspect of the present invention, there is provided a file management method that manages files on a plurality of file systems with a computer, comprising: a file information retrieve step that acquires the file information of source files on source file system and records the acquired file information as a file information event; a file operation trace step that acquires the information of file operation made for the source files and records the acquired file operation as a file operation event; and a namespace replication step that generates, based on the file information event and file operation event, a namespace replication database in which the namespace of the source files has been replicated logically.

In the present invention, mutual dependency between namespace information acquisition processing and namespace change event performed in parallel to the information acquisition processing by a different server, is analyzed to determine the actual sequence between them, which allows generating a consistent replication of the namespace of a source file system in a form of the namespace replication DB(database) while an application program that accesses the source file system is running. After that, the namespace replication DB is used to identify a segment of source namespace to be migrated and thereby file data can be copied onto a destination file system without omission, including an portion of namespace altered by application programs in parallel to the migration processing. Upon completion of the copy operation, a file access from the application is temporarily blocked, and cache data that a server holds is flushed and link is established in order to switch the subsequent file access, which is originally made to the source file system, to the destination file system, then the file access is resumed. With above configuration, it becomes possible to migrate file data between the different file systems without affecting the regular system operations. Application programs running during above operation may only experience a slight response time delay.

Further, in the present invention, the namespace replication DB is independently provided, and actual migration operation is performed after the actual segment of source file system to be migrated are identified using the information stored in the namespace replication DB. Therefore, the disk space required for performing a partial migration is reduced to the disk space required for storing the actual amount of data to be replicated. As a result, it is possible to significantly save the disk space compared with a case where the entire file system is once migrated and then unnecessary portion is deleted on the destination file system.

BRIEF DESCRIPTION OF THE DRAWINGS

FIG. 10 is a flowchart showing an example of operation of restore ( ) according to the present invention.

DETAILED DESCRIPTION OF THE PREFERRED EMBODIMENTS

An embodiment of the present invention will be described below with reference to the accompanying drawings.

In the present embodiment, an information processing system having a plurality of file systems and a plurality of servers is taken as an example.

Firstly, a configuration of the information processing system will be described.

Figure 1:
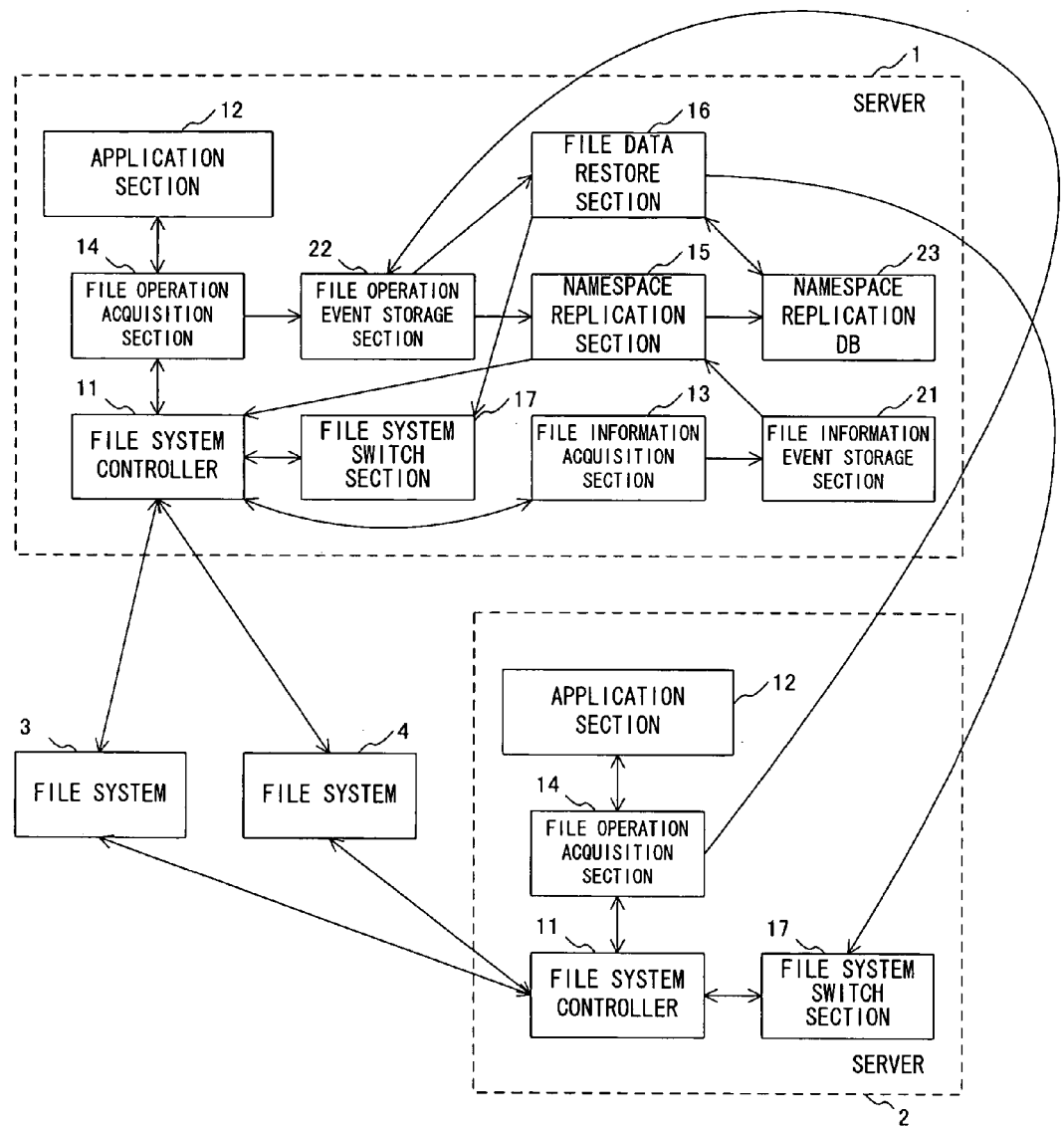
FIG. 1 is a block diagram showing an example of a configuration of the information processing system according to the present invention.

FIG. 1 is a block diagram showing an example of a configuration of the information processing system according to the present invention. The information processing system includes servers 1, 2, and file systems 3, 4. The servers 1 and 2 can access both the file systems 3 and 4. The server 1 serves as a file management apparatus according to the present invention. Hereinafter, a case where the server 1 migrates file data of the file system 3 to the file system 4 will be described.

The server 1 includes a file system controller 11, an application section 12, a file information acquisition section 13, a file operation acquisition section 14, a namespace replication section 15, a file data restore section 16, a file system switch section 17, a file information event storage section 21, a file operation event storage section 22, and a namespace replication DB (Database) 23. The server 2 includes the file system controller 11, application section 12, file operation acquisition section 14, and file system switch section 17. In the case where a file system is a local file system that cannot be shared between a plurality of servers, the server 2 does not exist.

The file system controller 11 controls the file systems 3 and 4. The application section 12 accesses the file systems 3 and 4 through the file system controller 11 and performs processing for an application.

The file information acquisition section 13 gets the name and attribute (file size, access authority list, or owner) of files existing in the source file system 3 and stores it, as a file information event, in the file information event storage section 21 in units of a file.

The file operation acquisition section 14 exists in all servers 1 and 2 that share the file systems 3 and 4. However, in a configuration such as a cluster file system, in which a metadata server running on a pre-defined certain server mediates and manages all accesses, the file operation acquisition section 14 may exist only on a server including the metadata server. The file operation acquisition section 14 may be implemented in the file system controller 11, or implemented outside the file system controller 11 as a filter driver. In the latter case, the file operation acquisition section 14 intercepts a file operation request that the application section 12 has issued for the file system controller 11 and stores it in the file operation event storage section 22. The file operation event storage section 22 transfers a file operation event to the namespace replication section 15 or file data replication section 16. The transfer of the file operation event can be done through a communication mechanism or through a special file.

The namespace replication section 15 controls namespace replication processing in the file system 3. The namespace replication section 15 exists in the server (server 1) serving as a file management apparatus among servers (servers 1 and 2) that share the file systems 3 and 4. The namespace replication section 15 combines respective file information events and file operation events for the source file system 3 to estimate the latest namespace and creates a logical copy of the namespace in the namespace replication DB 23.

The file data restore section 16 uses the namespace replication DB 23 to create a copy (including namespace information) of a file to be migrated in the source file system 3 on the destination file system 4. More specifically, the file data restore section 16 uses file write event data included in the file operation events stored in the file operation event storage section 22 and the namespace replication DB 23 to create a file on the destination file system 4, reads necessary file data from the source file system 3, and writes the data into the destination file system 4, thereby creating a copy of the source file.

The file system switch section 17 temporarily restrains and resumes file operation from the application section 12 according to an instruction from the file data restore section 16. When being instructed to switch the file system along with the resumption of the file operation, the file system switch section 17 modifies control data of the file system control section on memory so that the source file system 3 holds consistent data and sets link information to the destination file system 4. Like the file operation acquisition section 14, the file system switch section 17 exists in all servers that share the file systems 3 and 4. Further, the file system switch section 17 may be implemented in the file system controller 11, or implemented outside the file system controller 11 as a filter driver.

There can be added a selective file information acquisition option to the above configuration. In the case where the file information acquisition section 13 registers file information of only some files in a file system in the namespace replication DB 23, and the namespace replication section 15 recognizes that source files have been removed from the migration source, or contrary, the files that had been exempted from the source at the start of processing have added to the migration source, the selective file information acquisition option regards the above case as an error and cancels the file migration processing. By limiting the processing source to some files in a file system using the selective file information acquisition option, speed-up, resource saving, and simplification of the file migration processing can be achieved.

A concrete example of data structures of the file information event storage section 21, file operation event storage section 22, and namespace replication DB 23 will next be described.

Firstly, a data structure of the file information event (getstat event) in the file information event storage section 21 will be described.

The file information events that the file information acquisition section 13 acquires from the file system 3 are described below. In some cases, information acquisition time that indicates the order in which a respective file information event and file operation event occurs may not be returned in some file system. In the system in which the information acquisition time is not returned, the time when the information acquisition section 13 acquired information from the file system is set as the information acquisition time. In this case, however, the exact sequence in which the file information event and file operation event occurred, cannot be determined simply with reference to the time that has been set in each event data.

--- event.rectype = getstat. (indicating this is a file information event)
event.m_inode# = inode number of the parent directory
event.fname = name of directory or file
event.inode# = inode number of file or directory
event.attr = attribute such as owner or access authority of file or directory
event.ftype = dir (in the case where source is a directory) or
file (in the case where source is a file)
event.time = file information acquisition time
event.node = node that acquires file information

---

Next, a data structure of the file operation event stored in the file operation event storage section 22 will be described.

The file operation event created by the file operation acquisition section 14 indicates the content of file operations such as file generation operation, file delete operation, or file write operation and includes operation name, operation time and the like. The data included in the file operation event differs depending on the operation type, and, hereinafter, file operation event data corresponding to the respective operations of: creating file or directory (create event); deleting file or directory (delete event); renaming file or directory (rename event); assigning new name to file (link event); and writing file (write event) will be described.

File operation events generated for a create event are shown below. If the requested file has already existed, when a file creation request is issued, the original file is used without change. In the case of directory creation, when a plurality of directories having the same name exist, it is regarded as an error.

--- event.rectype = create
event.m_inode# = inode number of the parent directory
event.inode# = inode number of created file or directory
event.fname = name of created file or directory
event.ftype = dir (in the case of directory creation) or file (in the case of file creation)
event.attr = attribute such as owner or access authority of the created file or directory
event.time = time when this event occurs
event.node = number indicating a node that creates this event

---

File operation events for a delete event are shown below.

--- event.rectype = delete
event.m_inode# = inode number of the parent directory
event.inode# = inode number of a deleted file or directory
event.fname = name of the deleted file or directory
event.ftype = dir (in case of directory removal) or file (in case of file removal)
event.time = time when this event occurs
event.node = number indicating a node that creates this event

---

File operation events for a rename event are shown below. In the case where a file or directory having the same name with source one exists in the destination file system and the file or directory is not the same type (file or directory) as the source one, it is regarded as an error. In the case where the rename target file or rename target directory is the same type as the source one, the file or directory of the same name that has already existed in the source file system is deleted.

--- event.rectype = rename
event.m_inode# = inode number of the parent directory
event.inode# = inode number of a source file or directory
event.fname = name of the source file or directory
event.target.m_inode# = inode number of the destination directory
event.target.fname = name of the file or directory after the rename operation
event.ftype = dir (in the case where source is directory) or file (in the case where source is file)
event.time = time when this event occurs
event.node = number indicating a node that creates this event

---

File operation events for a link event are shown below. This is an operation performed to assign an extra new name to an existing file. This operation cannot be

--- event.rectype = link
event.m_inode# = inode number of the parent directory
event.inode# = inode number of a source file
event.fname = assigned new name (alias file name)
event.ftype = file
event.time = time when this event occurs
event.node = number indicating a node that creates this event

---

File operation events for a write event are shown below.

--- event.rectype = write
event.inode# = inode number of a file to be written

-continued

```
event.offset = byte offset within the file indicating update start position
event.length = number of bytes indicating update range
event.time = time when this event occurs
event.node = number indicating a node that creates this event
```

Next, a data structure of the namespace replication DB 23 will be described.

The namespace replication DB 23 is a relational database having columns (dbe) shown below, each of which having a tuple corresponding to a directory entry (a file element or a directory element) that has been set in a directory.

```
dbe.m_inode#: inode number of the parent directory
deb.ftype: dir (in the case where this tuple indicates directory) or file (in
the case where this tuple indicates file)
dbe.fname: name of file or directory
dbe.inode#: inode number of file or directory
dbe.attr: information such as owner or access authority of file or directory
dbe.active: on (in the case where file information has been acquired) or off
(in the case where file information has not yet been acquired)
dbe.candit: on (presence or absence is not obvious) or off (file/directory
indicated by this tuple certainly exists)
dbe.inrestore: if "on", this indicates that file data is being restored
to destination file system.
dbe.time: event time
``` dbe.node: number of a node in which this tuple has been registered with file operation event as a start. Null is set in tuple that has been created according to file information acquisition event. In the case where node that creates file cannot be identified (that is, in the case where there is possibility that different nodes create same file within maximum possible time lag), NULL is set in tuple. dbe.cmptime: data migration completion time Next, operation of file migration processing performed by the server 1 will be described.

Figure 2:
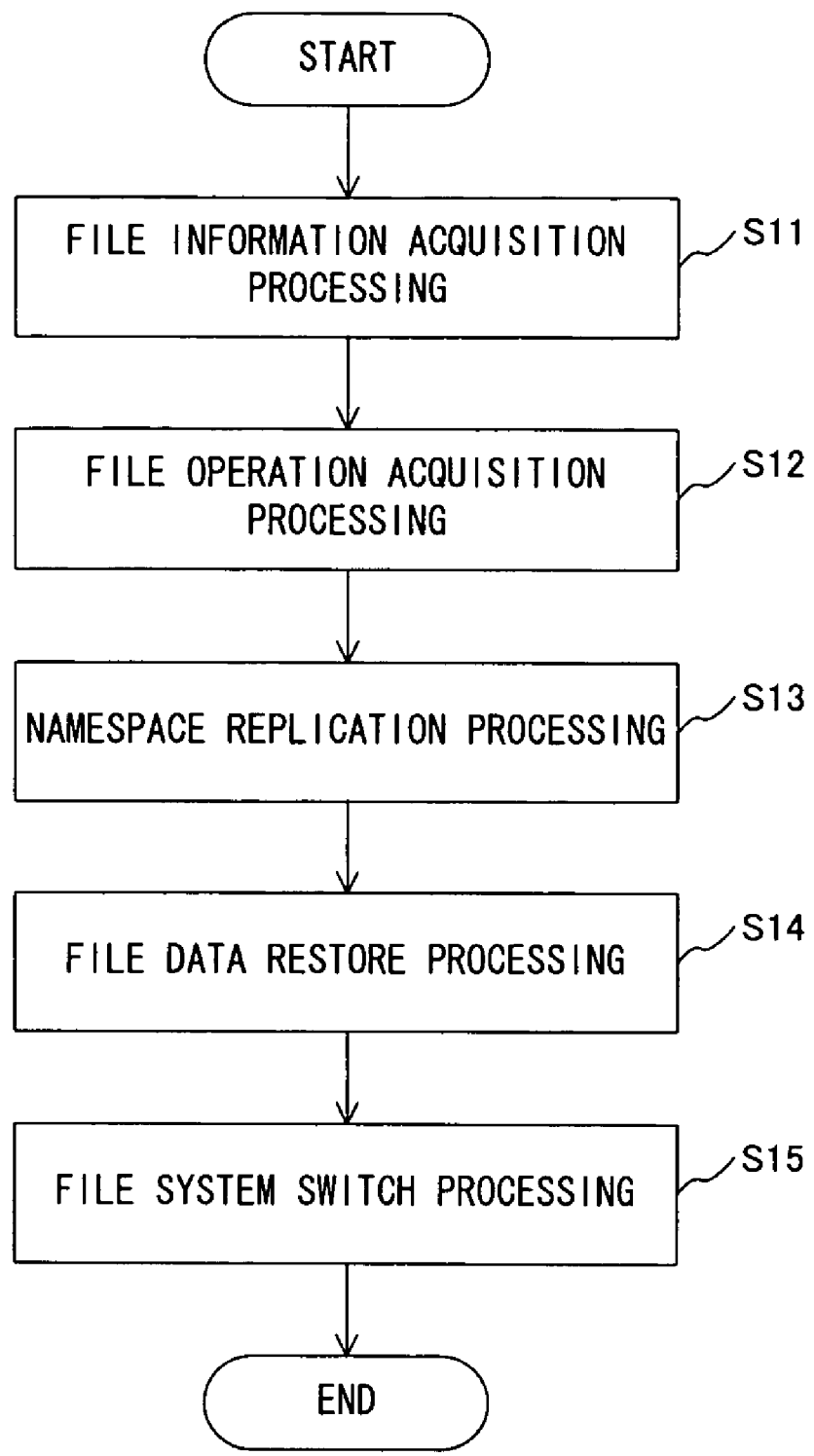
FIG. 2 is a flowchart showing an example of operation of file migration processing performed by a server according to the present invention.

FIG. 2 is a flowchart showing the outline of the operation of file migration processing performed by the server according to the present invention. The server 1 performs, as file migration processing, file information acquisition processing (S11), file operation acquisition processing (S12), namespace replication processing (S13), file data restore processing (S14), and file system switch processing (S15).

Figure 3:
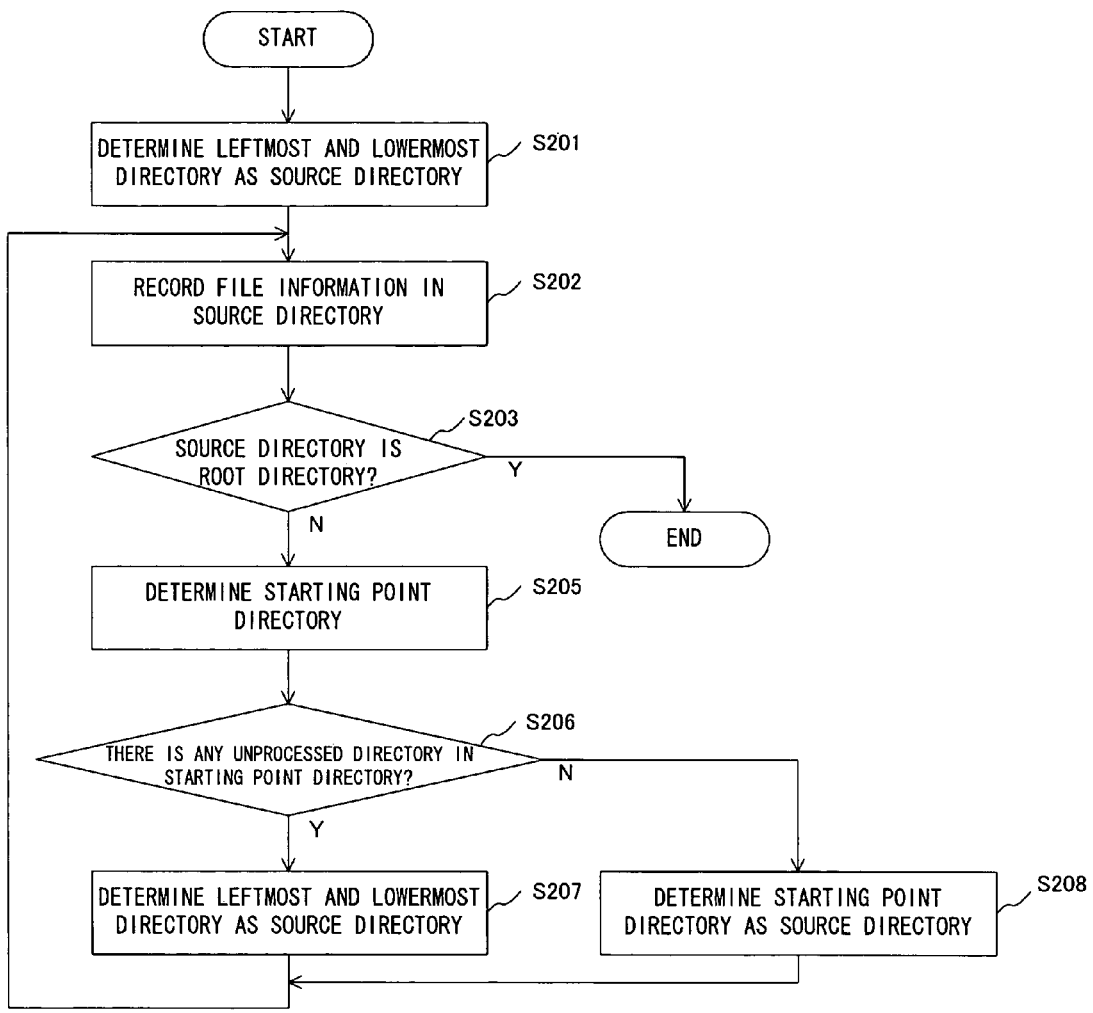
FIG. 3 is a flowchart showing an example of operation of file information acquisition processing according to the present invention.

Firstly, the file information acquisition processing performed by the file information acquisition section 13 will be described. FIG. 3 is a flowchart showing an example of the operation of file information acquisition processing according to the present invention.

Figure 4:
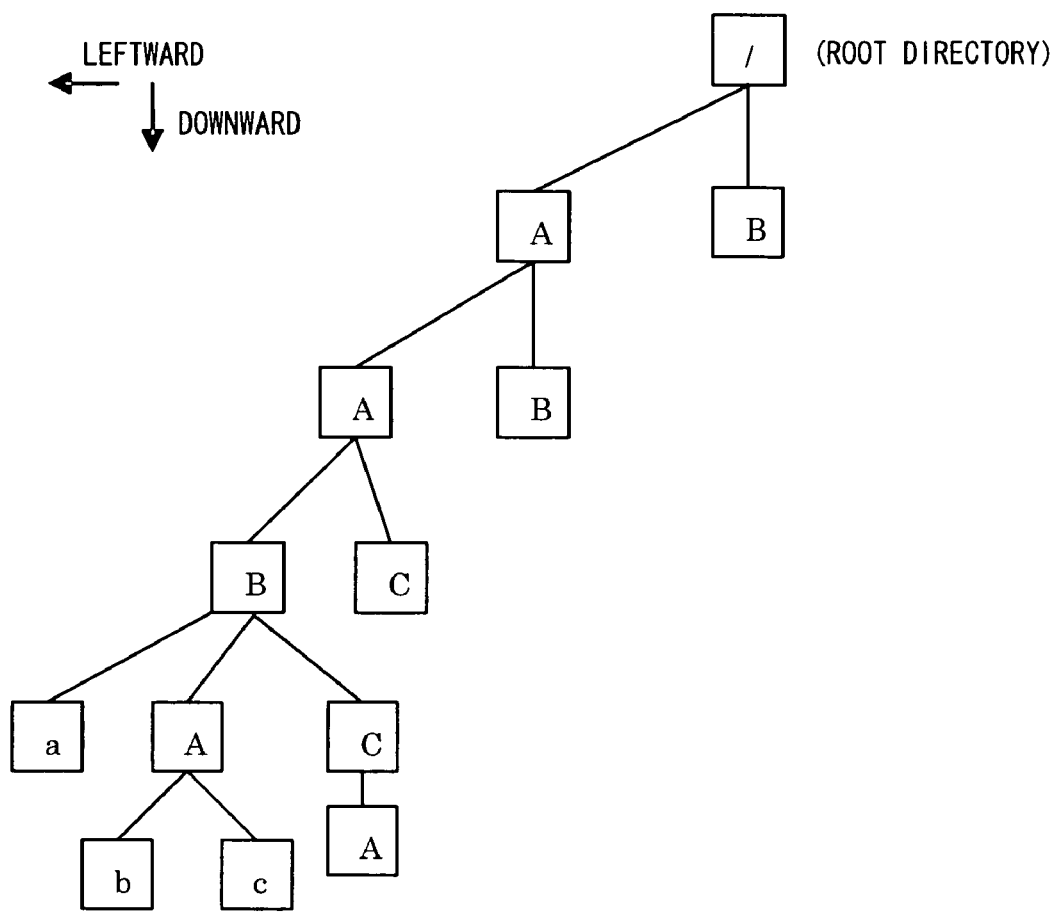
FIG. 4 is a view showing an example of a hierarchical structure of a directory in namespace.

The file information acquisition section 13 sweeps namespace in the ascending order (or descending order) in terms of pathname to acquire information of directories and files existing in the source file system 3 without omission. FIG. 4 is a view showing an example of a hierarchical structure of the directory in the namespace. As shown in FIG. 4, the namespace in the source file system 3 is obtained by sorting the names of directories and files in the directory hierarchical structure in the ascending order from left to right. The file operation issued during the file information acquisition processing is recorded as another file operation event and, in this case, the obtained namespace is later corrected.

In the directory hierarchical structure of the source file system 3, the file information acquisition section 13 always follows a directory at the left end (directory having the alphabetically smallest name among the directories in the current hierarchy) downward with the root directory set as a starting point and finds the leftmost and lowest directory. The file information acquisition section 13 then sets the leftmost and lowest directory as the first source directory and sets the pathname of the source directory obtained in the course of the source directory search as the source directory pathname (S201).

The file information acquisition section 13 then reads the content of the source directory and sequentially records the file information of the source directory and file information of all files (except for directory) existing in the source directory in the file information event storage section 21 as file information events (S202). In the case where the source directories are /A/A/B/A in the example of FIG. 4, the file information acquisition section 13 outputs the file information of /A/A/B/A, /A/A/B/A/b, and /A/A/B/A/c to the file information event storage section 21 as file information events. The file information acquisition section 13 ignores a file that had existed when the file information acquisition section 13 read the directory but had disappeared when it acquired the file information. For example, if the file information acquisition section 13 does not find the file information of /A/A/B/A/b at the file information read time, it ignores this file and outputs the file information events of /A/A/B/A and /A/A/B/A/c.

The file information acquisition section 13 then determines whether the source directory is the root directory or not (S203). When the source directory is the root directory (Y in S203), it means that all files has been processed and therefore the file information acquisition section 13 ends this flow. On the other hand, when the source directory is not the root directory (N in S203), the file information acquisition section 13 branches to the next step.

The file information acquisition section 13 then acquires the pathname of the directory one level above the source directory and searches again for the directory that has the acquired directory pathname from the root directory. The last directory whose existence has been confirmed by the search is set as the starting point directory (S205). In the case where a directory in the middle of the path has been moved to another location in the namespace by rename operation or the like, the migrated directory cannot be found in the course of the search. When the source directory is A/A/B/A in the example of FIG. 4, the directories except for the end directory /A, that is, A/A/B become the starting point directories. If the file information acquisition section 13 cannot find /A/A in the course of re-searching /A/A/B starting from the root (/), /A is set as the starting point directory.

The file information acquisition section 13 then reads the content of the starting point directory and uses the current source directory path to determine whether there is any unprocessed directory in the starting point directory (S206). When determining that there is any unprocessed directory in the starting point directory (Y in S206), the file information acquisition section 13 sets the leftmost and lowermost directory among the unprocessed directories in the starting-point directory as a new source directory and sets the pathname thereof as the source directory pathname (S207). Assume that /A/A/B is the starting point directory and the current source directory pathname is /A/A/B/A in the example of FIG. 4. In this case, since directory C whose name is alphabetically greater than directory A exists in the starting point directory /A/A/B, the file information acquisition section 13 follows /A/A/B/C and /A/A/B/C/A in the order mentioned and sets /A/A/B/C/A as the new source directory and sets the pathname thereof as the source directory pathname.

In the case where there is no unprocessed directory in the starting point directory (N in S206), that is, in the case where there is no directory having a name alphabetically greater than one of the source directory pathname in the starting point directory, the file information acquisition section 13 sets the starting point directory as the source directory and sets the pathname thereof as the source directory pathname (S208). Assume that the starting point directory and current source directory pathname are /A/A/B and /A/A/B/C, respectively, in the example of FIG. 4. In this case, since there is no directory having a name alphabetically greater than C in /A/A/B and therefore A/A/B is set as a new source directory and the pathname thereof is set as the source directory pathname.

In the case where the selective file information acquisition option that acquires not the file information of all the files in the source file system, but the file information of the files has been set, the above processing is corrected as follows.

In step S201, the file information acquisition section 13 always follows a directory at the left end with not the root directory, but the top directory of the designated source files set as a starting point (pathname thereof from the root is referred to as top path) and finds the leftmost and lowest directory. In step S203, the file information acquisition section 13 determines not whether the source directory is the root directory, but whether the source directory is the top directory. In the case the source directory is the top directory (Y in S203), the file information acquisition section 13 ends this flow. On the other hand, if the source directory is not the top directory (N in S203), the file information acquisition section 13 branches to the next step. When the new starting point directory acquired in step S205 is not the top directory or directory some level below the top directory, it means that directories located above the top directory have been changed by rename operation and therefore the file information acquisition section 13 regards this state as an error and cancels the file information acquisition processing and all subsequent processing.

The file information acquisition section 13 then returns to step S202, and iterates processing for the found source directory.

As described above, applying the sorted pathname to the information acquisition processing prevents the system from going into an infinite loop even if the namespace is changed during the file information acquisition processing and allows the file information acquisition section 13 to acquire the file information in the namespace segment that has not been changed without omission. In place of sorting the entries in the directory in the ascending order in terms of file name, it is possible to sort them in the ascending order in terms of pathname with the offset in the directory as a reference.

Next, the namespace replication processing performed by the namespace replication section 15 will be described.

After completion of the file information acquisition processing performed by the sweeping of the namespace in the source file system (in the case where the selective file information acquisition option that acquires only the file information of the source files has been set, only the information of the files are acquired), the namespace replication section 15 reflects file operation events occurring during the file information acquisition processing to thereby perform the namespace replication processing. Hereinafter, a case where the order in which respective file operation events of different servers 1,2 occur can be determined and a case where the order in which respective file operation events cannot be determined will be described below, in the order mentioned.

Firstly, the namespace replication processing performed under the condition that the occurrence sequence of respective file operation events on different servers 1, 2 can be determined.

Figure 5:
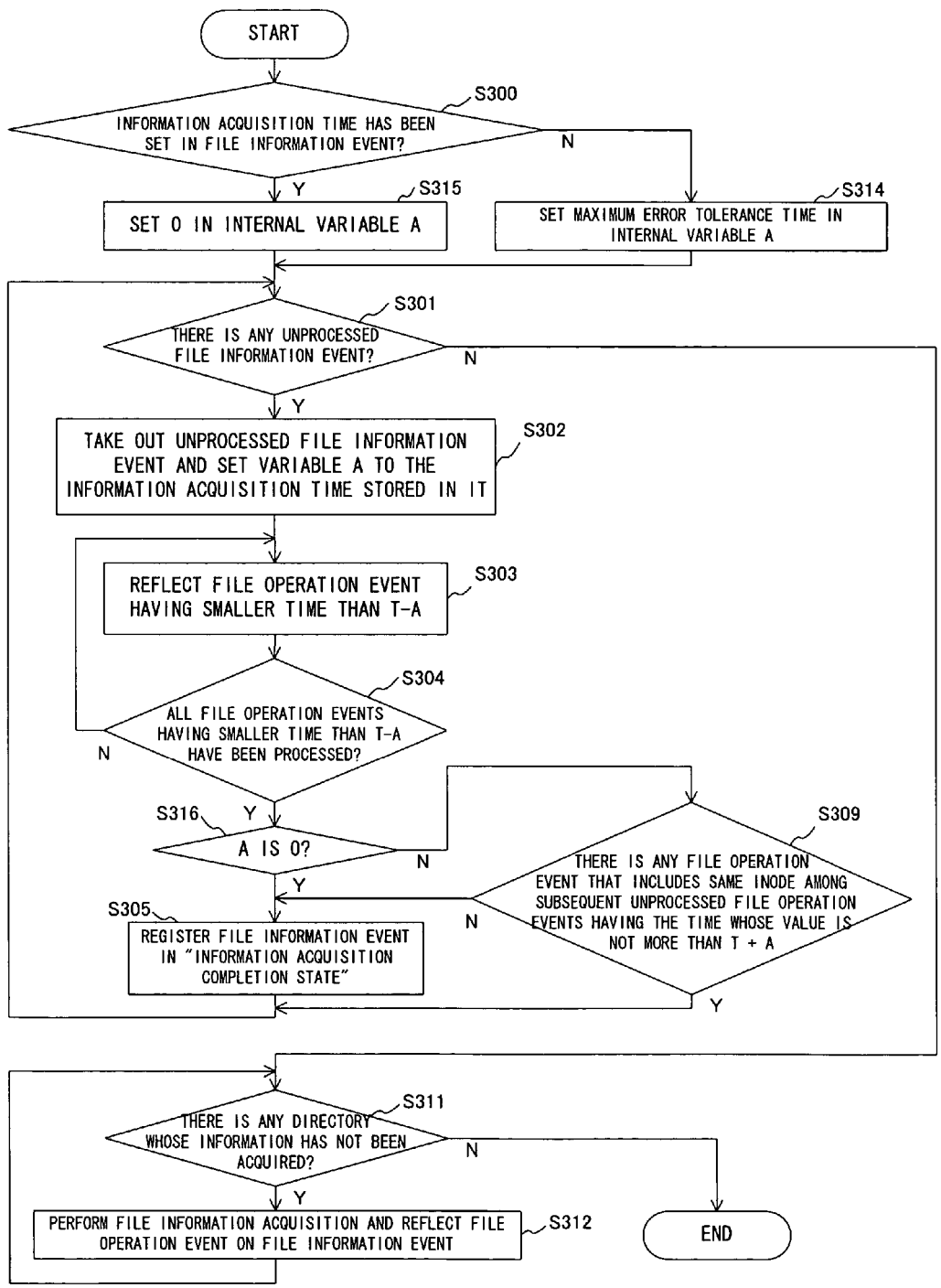
FIG. 5 is a flowchart showing an example of namespace replication processing performed in the case where the order in which respective file operation events occur can be determined.

FIG. 5 is a flowchart showing an example of the namespace replication processing performed in the case where the order in which respective file operation events occurred can be determined. This case corresponds to a case where there is only one server that uses a file server and it is possible to identify the order in which the file operation events set by the server that acquires the file operation event. Firstly, the namespace replication section 15 determines whether information acquisition time contained in the file information event has been set by the file system (S300). In the case the file system has not set the information acquisition time (N in S300), the namespace replication section 15 sets pre-defined maximum possible time lag in internal variable A (S314). On the other hand, in the case information acquisition time has been set by the file system (Y in S300), the namespace replication section 15 sets 0 in the internal variable A (S315). When the information acquisition time set in the file information event has been set not by a file system, but by the file information acquisition processing, whether the file operation event precedes the file information event or not cannot easily be determined. The maximum value of a difference between the accurate clock when the event occurred and the time set in the event data as the information acquisition time is referred to as maximum possible time lag. An appropriate value obtained from an experience is pre-defined as a fixed value. If the following both condition hold between information acquisition time of event data 1 (event data 1.time) and information acquisition time of event data 2 (event data 2.time), the namespace replication section 15 determines that the event data 1 precedes the event data 2.

event data2.time > event data1.time and
event data2.time − event data1.time > maximum possible time lag The namespace replication section 15 then determines whether there is any unprocessed file information event (S301). In the case that there is no unprocessed file information event (N in S301), the namespace replication section 15 branches to step S311. On the other hand, in the case that there is any unprocessed file information event (Y in step S301), the namespace replication section 15 takes out a top (oldest) event data from unprocessed file information events set and sets the internal variable T (S302) to the value stored in the event data as a information acquisition time. The namespace replication section 15 then sequentially takes out file operation events that are assumed to precede the taken out file information event (that is, file operation events having information acquisition time smaller than T-A) and reflects them on the namespace replication DB 23 (S303). Hereinafter, the operation will be described for each type (file delete, file creation, file name change, file new name assignation, and file write) of the file operation event.

In the case where the file operation event is file delete type operation (file delete or directory delete), the namespace replication section 15 deletes source inode if it has been registered and ignores if not registered. Here, in the case where there exists an entry that satisfies the following all conditions, the source inode is regarded as being registered.

```
dbe.inode# == event.inode#
dbe.m_inode# == event.m_inode#
dbe.fname == event.fname
```

In the case where the file operation event is file creation type operation (file creation or directory creation), the namespace replication section 15 registers source file inode if it has not been registered and ignores if registered. In the case where there exists an entry that satisfies the following all conditions, the source inode is regarded as being registered.

```
dbe.inode# == event.inode#
dbe.m_inode# == event.m_inode#
dbe.fname == event.fname
```

The content to be registered in the case where the source inode has not been registered is shown below. In the case where the selective file information acquisition option is effective, registration is made only when the source inode has not been registered and a directory corresponding to event.m_inode# has already been registered in "information acquisition completion state" (information acquisition thereof has been completed). That is, only when (dbe.inode#==event.m_inode#, dbe.active==on) is satisfied, the following tuple is registered. Otherwise, even if the source inode has not been registered, the corresponding file operation event is ignored (even if this file operation event is ignored here, the outcome of this file operation event is supposed to be included in the subsequent file information acquisition event if it is specified as a migration source unless the information of the parent directory has already been acquired).

```
dbe.m_inode# = event.m_inode#
dbe.ftype = event.ftype
dbe.fname = event.fname
dbe.inode# = event.inode#
dbe.attr = event.attr
dbe.active = on: indicating that information has been acquired
```

In the case where the file operation event is file name change (rename) type operation, the namespace replication section 15 processes this event in the following procedure.

In the case where a file or directory having the same name as one specified as target of rename processing in the file operation event of the file name change type has been registered in the namespace replication DB 23 (evaluated by file name and parent inode number), the namespace replication section 15 deletes the corresponding entry from the namespace replication DB 23. In the case where there exists an entry that satisfies the following all conditions, the file or directory having the same name as one obtained after rename processing is regarded as being registered.

```
dbe.fname == event.target.fname
dbe.m_inode# == event.target.m_inode#
```

In the case where a source file specified in the file operation event of the file name change type has been registered in the namespace replication DB 23, the namespace replication section 15 updates the parent information and file name of the corresponding entry. In the case where there exists an entry that satisfies the following all conditions, the source file is regarded as being registered.

```
dbe.inode# == event.inode#
dbe.m_inode# == event.m_inode#
dbe.fname == event.fname
```

The content to be changed at this time is shown below. Although the source file may be exempted from the migration source in the case where the selective file information acquisition option is effective, this is ignored here to simplify the processing.

```
dbe.m_inode# = event.target.m_inode#
dbe.fname = event.target.fname
```

In the case where a source file specified in the file operation event of the file name change type has not been registered in the namespace replication DB 23, the namespace replication section 15 registers a renamed file in the namespace replication DB 23 as a new entry. The content to be registered at this time is shown below. In the case where the selective file information acquisition option is effective, registration is made only when the source file has not been registered and a directory corresponding to event.m_inode# has already been registered in "information acquisition completion state". That is, only when (dbe.inode#==event.m_inode#, dbe.active==on) is satisfied, the following tuple is registered. Otherwise, even if the source file has not been registered, the tuple registration is not made in this file operation event (even if this file operation event is ignored here, the effect of this file operation event is supposed to appear in the subsequent file information acquisition event if it is specified as a migration source unless the information of the parent directory has already been acquired).

```
dbe.inode# = event.inode#
dbe.m_inode# = event.target.m_inode#
dbe.fname = event.target.fname
dbe.ftype = event.ftype
dbe.active = off
```

In the case where the file operation event is file new name assignation (link) type operation, the namespace replication section 15 ignores this file operation event when the tuple corresponding to the link event has already existed in the namespace replication DB 23 (when the source inode has been registered and correspondence is established in the file name and directory). Otherwise, the namespace replication section 15 registers information of this event in the namespace replication DB 23. When the following conditions are satisfied, the corresponding tuple is regarded as being existent.

```
dbe.inode# == event.inode#
dbe.m_inode# == event.m_inode#
dbe.fname = event.fname
```

The content to be registered when the tuple corresponding to the file operation event has not been registered is shown below. In the case where the selective file information acquisition option is effective, registration is made only when the tuple corresponding to the file operation event has not been registered and a directory corresponding to event.m_inode# has already been registered in "information acquisition completion state". That is, only when (dbe.inode#==event.m_inode#, dbe.active==on) is satisfied, the following tuple is registered. Otherwise, even if the tuple corresponding to the file operation event has not been registered, this file operation event is ignored (even if this file operation event is ignored here, the result of this file operation event is supposed to be included in the subsequent file information acquisition event if it is specified as a migration source unless the information of the parent directory has already been acquired).

---
dbe.inode# = event.inode#
dbe.m_inode# = event.m_inode#
dbe.fname = event.fname
dbe.ftype = file
dbe.active = off

---

In the case where the file operation event is file write operation (write), the namespace replication section 15 ignores this file operation event, as there is nothing to be done at this time.

The namespace replication section 15 then determines whether all the file operation events that precede the file information event (that is, file operation event having information acquisition time smaller than information acquisition time T-A recoded in the file information event) have been processed or not (S304). When determining that there is any unprocessed file operation events (N in S304), the namespace replication section 15 returns to step S303. On the other hand, when determining that all the file operation events have been processed (Y in S304), the namespace replication section 15 determines whether the time recorded in the file information event is the time set by a file system or not, that is, A is 0 or not (S316).

In the case the time recorded in the file information event is not the time set by a file system and therefore the order in which respective file information event and file operation event has occurred cannot be determined (N in S316), the namespace replication section 15 branches to step S309. On the other hand, when determining that the time recorded in the file information event is the time set by a file system (Y in S316), the namespace replication section 15 registers this file information event in the namespace replication DB 23 as "information acquisition completion state" (S305). If the same file has already been registered, the namespace replication section 15 changes the content of all the corresponding registered tuples and, if necessary (that is, if all the registered entries have different names), registers a tuple corresponding to this file information event. In the case where there exists an entry that satisfies the following all conditions, the same file matching the file information event is regarded as being registered.

---
dbe.inode# == event.inode#

---

The content to be registered in the case where the same file information event has not been registered is shown below.

---
dbe.m_inode# = event.m_inode#
dbe.ftype = event.ftype
dbe.fname = event.fname
dbe.inode# = event.inode#
dbe.attr = event.attr
dbe.active = on

---

The content to be registered in the case where the same file information event has been registered is shown below.

---
dbe.active = on
dbe.attr = event.attr

---

In the case where there is no tuple that satisfies the following conditions, new tuples are registered even though the same file information event has been registered.

---
dbe.m_inode# == event.m_inode#
dbe.fname = =event.fname

---

The content to be registered in this case is shown below.

---
dbe.m_inode# = event.m_inode#
dbe.ftype = event.ftype
dbe.fname = event.fname
dbe.inode# = event.inode#
dbe.attr = event.attr
dbe.active = on

---

When branching to step S309 from step S316, the namespace replication section 15 sequentially checks the unprocessed file operation event to determine whether there is any file operation event that includes the same inode number among the file operation events which cannot be determined to follow the file information event (file operation events having the time whose value is not more than (file information acquisition time T+maximum possible time lag A)) (S309). In the case that there is any file operation event having the same inode number (Y in S309), the namespace replication section 15 ignores the corresponding file information event and go to step S301. This is because the update of the namespace replication DB 23 with the content of the file operation event might prevent the result of file operation from being ignored, and an indication indicating "information acquisition completion state" is not set, with the result that file information acquisition processing can be started again. On the other hand, in case that there is no file operation event having the same inode number (N in S309), the namespace replication section 15 proceeds to step S305 in order to register the corresponding file information event in the namespace replication DB 23.

In step S301, when there is no unprocessed file information event, that is, processing of all recorded file information event has been completed (N in S301), the namespace replication section 15 determines whether any segment (directory whose information has not been acquired) of the namespace that has been ignored in the file information acquisition process due to processing conflict with the file operation that changes the namespace exists or not (S311). If any directory whose information has not been acquired exists (that is, when tuples in which dbe.active is off and dbe.ftype is dir exist in the namespace replication DB) (Y in S311), the namespace replication section 15 performs file information acquisition processing with the relevant directory set as a root, reflects file operation events that has occurred during the above file information acquisition processing on the acquired file information events (S312) and returns to step S311, where the namespace replication section 15 repeats the above processing for another directory whose information has not been acquired. On the other hand, when there is no directory whose information has not been acquired (N in S311), the namespace replication section 15 ends this flow.

In the case where the selective file information acquisition option is effective, the namespace replication section 15 determines, in step S311, the existence of the directory whose information has not been acquired according to the following conditions: dbe.active is off, dbe.ftype is dir, and tuple dbe1 pointed by dbe.m_inode# is "information acquisition completion state" (dbe1.inode#==dbe.m_inode# and dbe1.active==on).

Next, the namespace replication processing performed under the condition that the order in which respective file operation events occurred cannot be determined will be described.

This is a case where file operation events are extracted by a plurality of different servers so that it is difficult to specify the order of occurrence not only between the file operation events but also between the file operation events and file information events. In this case, it is impossible to determine the order in which file creation, file delete, file new name assignment, file name change, and file information acquisition are performed. If file operation events are applied to the namespace replication DB 23 in different order from the actual order, files that is supposed to have been created may be deleted on the namespace replication DB 23 or, conversely, files that do not actually exist may be regarded as being existent erroneously.

In this case, firstly, the namespace replication section 15 tentatively registers a file/directory that is likely to have been created in the namespace replication DB 23 as candidate. The term "candidate" here means a file/directory whose existence cannot be uniquely determined. For example, when an event associated with creation operation and another event associated with delete operation occur at the same time for the same file/directory within the maximum possible time lag, the corresponding file/directory is registered as a candidate. However, this is not applied to the case where file operation events are generated from the same server and therefore it is possible to determine the order of occurrence between them even though they have occurred simultaneously within a period of the maximum possible time lag.

Upon confirming the presence or absence of the candidate file/directory by inspecting the following file operation events or file information events, the namespace replication section 15 excludes the relevant file/directory from the candidate group (deletes corresponding tuples from the namespace replication DB 23 or resets a candidate indicator) to finally specify the namespace. For example, when there exist a subsequent event confirming the nonexistence of a file that has been registered as a candidate, a tuple indicating "candidate" are deleted. Further, when a file having the same inode number as a candidate but different name therefrom is generated for the common mother directory, it means that the candidate file did not actually exist and therefore the namespace replication section 15 deletes the candidate file.

In the case where some candidate files/directories are present even after the namespace replication section 15 has completed processing of all file operation events, the namespace replication section 15 checks whether the candidate files/directories actually exist or not in the source file system to thereby narrow down the number of candidates.

Details of the namespace replication processing in this case will be described later. Here is the outline thereof.

The namespace replication section 15 extracts the file information event, file operation event of file creation type, and file operation event of file new name assignment type included within the maximum possible time lag range and registers them in the namespace replication DB 23. Even if the same inode number has already been registered, if the parent attributes are different (parent inode number or file name is different), the namespace replication section 15 registers the corresponding tuple as a new tuple in "information acquisition completion state". Further, in the case where the same inode number as well as the same parent attribute has been registered, the namespace replication section 15 updates the found tuple to "information acquisition completion state". The initial contents of a directory that has been newly created is always null (state where there is no file/directory below the relevant directory). Accordingly, when a new file/directory is created below the relevant directory, a corresponding file operation event of file creation type appears after the creation of a new file/directory. Therefore, even if the new directory is registered in "information acquisition completion state", the namespace replication section 15 does not fail to acquire the namespace information below the relevant directory. Note that, as mentioned before, new name cannot be assigned to a directory. So registering a new tuple corresponding to a new name assignment event in "information acquisition completion sate" cause no problem.

In the case where the selective file information acquisition option is effective, only when "information acquisition completion state" is set in a tuple corresponding to a parent directory, or a file information acquisition event having the same inode number exists within the maximum possible time lag, tuple registration is made. That is, unless registration of the parent directory has been made in "information acquisition completion state" or the information acquisition event of the parent directory is included within the maximum possible time lag, tuple registration is not made even if a file operation event of file creation type or file operation event of file new name assignment type has appeared and this file operation event is ignored.

The namespace replication section 15 applies a file operation event of file name change type having a information acquisition time in the same time lag range. In this case, when the inode number has not been registered or, if registered, the parent attribute (parent inode number and file name) of a parent of the rename target included in the file operation event and registered data do not entirely match each other, the namespace replication section 15 registers a new tuple having a parent of the rename target as a parent attribute in "information acquisition incomplete state". A directory having a file/directory below itself may be renamed, so that it is impossible to set this tuple to "information acquisition completion state".

However, in the case where the selective file information acquisition option is effective, only when "information acquisition completion state" is set in a tuple corresponding to a rename target parent directory, or a file information acquisition event having the same inode number exists within the maximum possible time lag period of time, tuple registration is made. That is, unless registration of the parent directory has been made in "information acquisition completion state" or the information acquisition event of the parent directory is found within the maximum possible time lag period of time, tuple registration is not made even if a file operation event of file name change type has appeared.

When finding a file operation event associated with delete of the relevant file (that is, newly registered tuples), the namespace replication section 15 adds a candidate indication to the tuples to indicate them as candidate tuples. This is performed when the namespace replication section 15 finds a file operation event that is likely to delete the tuples which has been registered within the maximum possible time lag period of time. More specifically, this is the case where there happened competing rename file operations, one deletes the file that the other creates, during the same maximum possible time lag period.

When confirming the existence of a candidate tuple (preceding candidate tuple) that can be determined to precede a given operation event based on tuple creation time, the namespace replication section 15 removes the candidate indication of the candidate tuple to indicate that the tuple is not candidate. Whether a tuple is a preceding tuple or not is determined based on a relation between tuple registration time, event time, tuple registration server and event issuance server. In the case where the preceding candidate tuple corresponds to one of a source of file rename operation, file write operation, and file creation operation, the candidate indication of the preceding candidate tuple whose existence has not been confirmed yet can be removed.

When finding the preceding candidate tuples inconsistent with an event operation to be processed, that is, the preceding candidate tuples that do not actually exist, the namespace replication section 15 deletes all these tuples from the namespace replication DB 23. When an operation event of rename type or operation event of delete type occurs, it can be determined that the candidate tuple did not actually exist.

After completion of processing of all file operation event data, and file information event data, the namespace replication section 15 finds a directory whose data has not been acquired yet (that is, dbe.active is off) on the namespace replication DB 23 and sets the found directory as a root to perform file information acquisition processing and file operation event reflection processing again.

In the case that there is no directory whose information has not been acquired, the namespace replication section 15 checks remaining candidate tuples and inquires of the source file system for the existence of the corresponding file. Based on the check result, the namespace replication section 15 deletes all the tuples that do not actually exist.

After deleting all the candidate tuples, whose corresponding files are not present on the source file system, the namespace replication section 15 ends the namespace replication processing.

Figure 6:
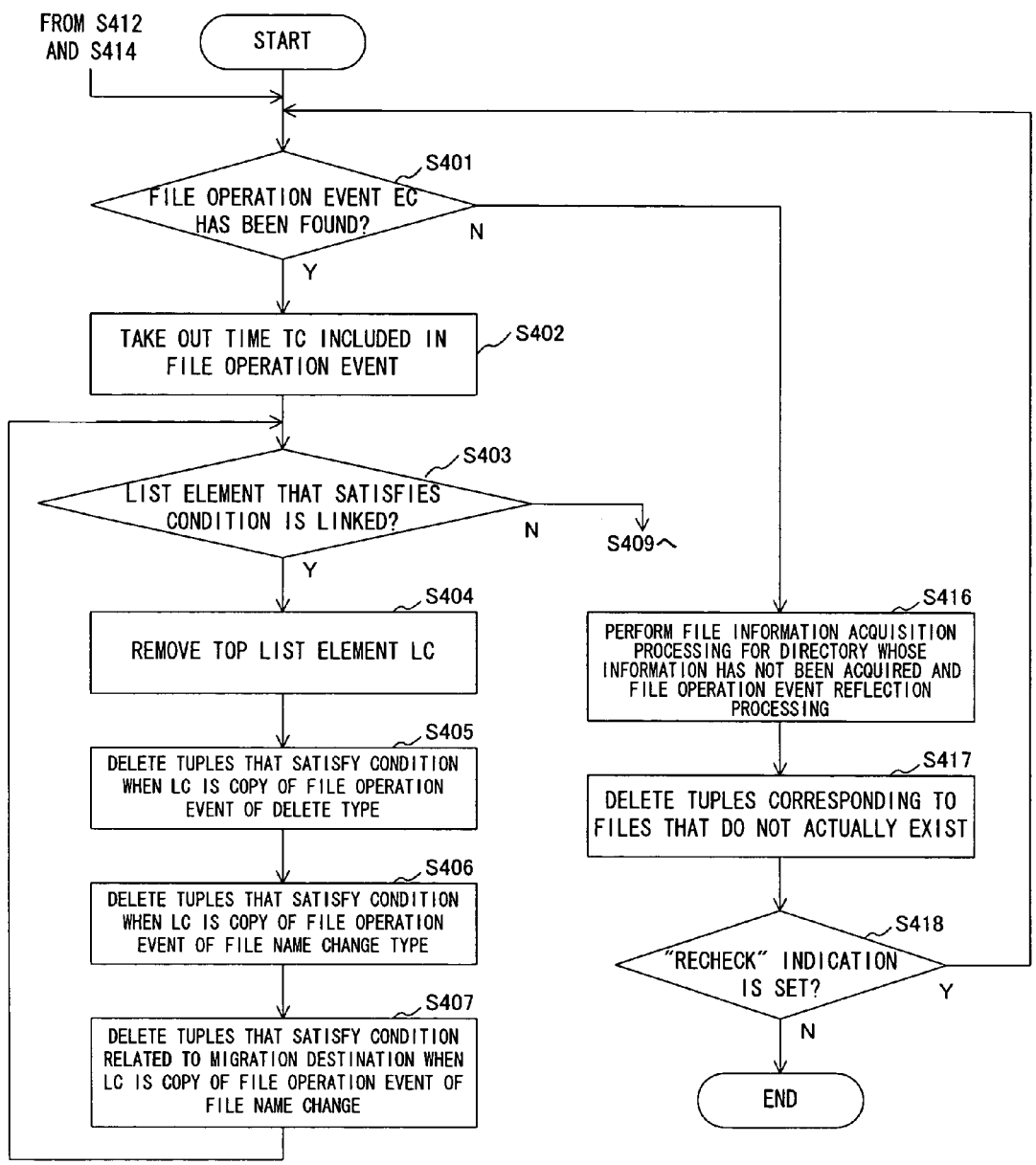
FIG. 6 is a first flowchart showing an example of concrete operation of the namespace replication processing according to the present invention.
Figure 7:
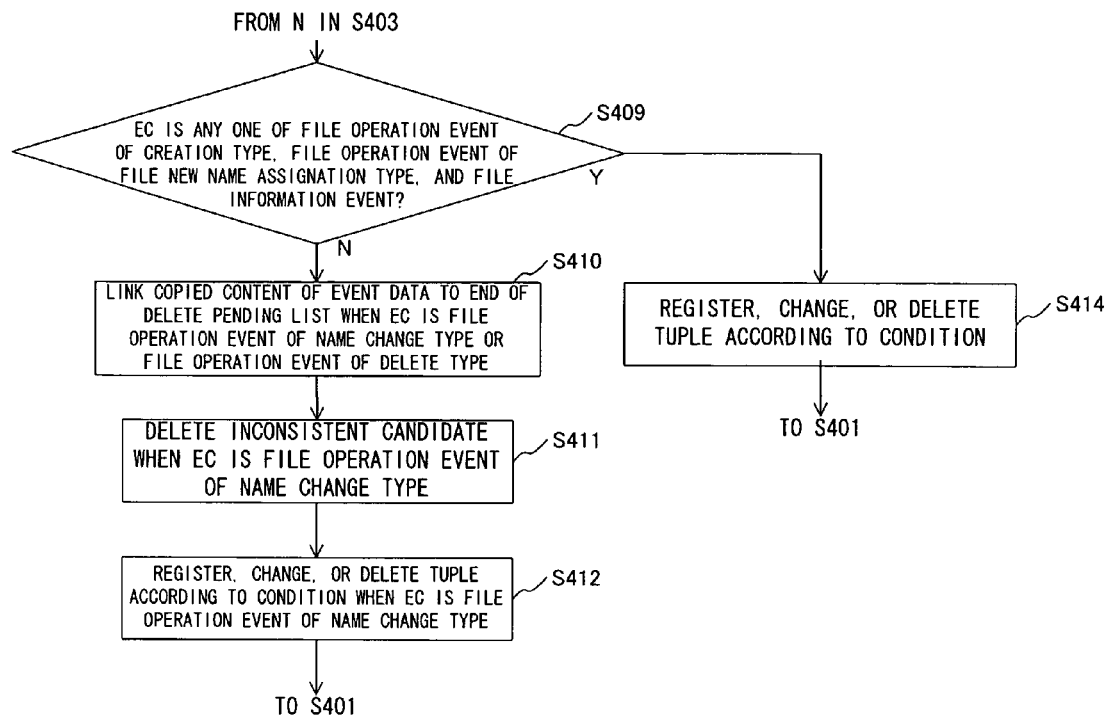
FIG. 7 is a second flowchart showing an example of concrete operation of the namespace replication processing according to the present invention.

Next, an example in which the above namespace replication processing has been implemented on the system will be described. FIGS. 6 and 7 are flowcharts each showing an example of concrete operation of the namespace replication processing according to the present invention.

A flowchart of the namespace replication processing in the case where a generation number can be used under the condition that the order of occurrence of different file operation events generated by different servers cannot be determined is firstly shown.

The generation number is a number used when the same inode number is recycled and set in order to distinguish a new file/directory and a former file/directory having the same inode number from each other. The generation number is implemented as a counter that counts up every time the inode is assigned. In this case, a file is identified by an inode number including the generation number. Consequently, the same number is never recycled during the maximum possible time lag period.

Therefore, in a file system that uses the generation number and, further, in the case where the generation number that the file system assigns can be included in the inode number that is set in the file information event and file operation event, the namespace replication section 15 can detect inconsistency by utilizing characteristics that the common inode number is never assigned twice within the maximum possible time lag period of time.

On the other hand, in a file system that does not use the generation number for the assignation of the inode number, or in the case where the generation number cannot be included in the file information acquisition or file operation event even in a file system that uses the generation number (that is, a file system in which the generation number constituting the inode number is fixed to 0), there is a possibility that the same inode number is redundantly assigned within the maximum possible time lag. This is a case where the inode number that has been released due to file delete is used by a file created immediately after the release.

How this flowchart is changed in order to cope with the case where the generation number cannot be utilized will be described later.

The namespace replication section 15 checks the oldest unprocessed file information event and oldest unprocessed file operation event for each server to search for those having the smallest time and determines the existence of the event Ec (S401). When determining that the event Ec has been founded (Y in S401), the namespace replication section 15 takes out the event Ec and recognizes the time included in the event as Tc (S402). When the event Ec is not found (that is, after reflection of all file operation events has been completed) (N in S401), the namespace replication section 15 branches to step S416.

Figure 8:
FIG. 8 is a block diagram showing an example of a configuration of a delete pending list according to the present invention.

The namespace replication section 15 then determines whether a list element having the event time smaller than (Tc−maximum possible time lag) is linked to a delete pending list (S403). When determining that the list element is not linked (N in S403), the namespace replication section 15 branches to step S409. The delete pending list, which is a list on a memory, stores the content of the file operation event associated with file delete that cannot be applied to the namespace replication DB 23 until the maximum possible time lag has gone. FIG. 8 is a block diagram showing an example of a configuration of the delete pending list according to the present invention. As shown in FIG. 8, the delete pending list stores a delete pending list header and a file operation event of delete type or file operation event of file name change linked to the delete pending list header.

The namespace replication section 15 then removes the top list element (Lc) in the delete pending list (S404). After that, when the Lc is a copy of a file operation event of delete type (delete event), the namespace replication section 15 uses the inode number set in the Lc to search the namespace replication DB 23 and deletes all tuples whose parent inode number and file name match counterpart set in the Lc (S405). Since there is no possibility that reassignment of the deleted inode number is made during the maximum possible time lag period in a system that uses the generation number, the above delete processing can be performed without problems. Files each having a different parent inode number and file name are assumed to be aliases and therefore corresponding tuples are left unaltered. Found tuples having a different type or found entire tuples in which dir type is set can be deleted.

Search criteria for the namespace replication DB 23 is shown below.

```
dbe.inode# == event.inode#
    Tuple delete condition is shown below.
    (dbe.m__imode# == event.m__inode# and dbe.fname == event.fname)
or
event.ftype == dir
or
event.ftype ! == dbe.ftype
```

In the case where the Lc is a copy of a file operation event of file name change type (rename event), the namespace replication section 15 uses the inode number set in the Lc to search the namespace replication DB 23 and deletes all the registration tuples that satisfy the following condition from the namespace replication DB 23 (S406).

The condition is: the parent inode number matches the source parent inode number set in the Lc; file name matches the source file name set in the Lc; and event time has a value smaller than (time set in the Lc−maximum possible time lag).

The namespace replication section 15 sets the candidate indication, on the namespace replication DB 23, for the tuples that cannot be deleted because the event time thereof is not smaller than (time set in the Lc−maximum possible time lag) although the conditions except for the event time are satisfied to indicate that corresponding tuples are candidate tuples. However, in the case where a creation node set in the found tuple matches an event output node set in the Lc and the event time set in the Lc is greater then the event time set in the tuple, the namespace replication section 15 regards the found tuple as one that satisfies the condition and deletes it.

Search criteria for the namespace replication DB 23 is shown below.

```
dbe.inode# == event.inode#
```

Tuple delete condition is shown below.

```
(dbe.fname == event.fname
and dbe.m__inode# == event.m__inode#
and (dbe.time < event.time − maximum possible time lag
or (dbe.time < event.time
and dbe.node# == event.node#)))
```

Tuple update condition is shown below.

```
(dbe.fname == event.fname
and dbe.m__inode# == event.m__inode#
and dbe.time >= event.time − maximum possible time lag
and dbe.node# ! = event.node#)
```

Tuple update content is shown below.

```
dbe.candit = on
```

In the case where the Lc is a copy of a file operation event of file name change type (rename event), the namespace replication section 15 searches the namespace replication DB 23 to find a tuple having a rename target parent inode number set in the Lc as a parent inode number and a rename target file name set in the Lc as a file name. Then, the namespace replication section 15 deletes a found tuple having event time smaller than (time set in the Lc−maximum possible time lag). Further, the namespace replication section 15 deletes a found tuple having a creation node matching an event generation node set in the Lc and having event time smaller than the time set in the Lc (S407). If two or more founded tuples that have not been deleted remain, the namespace replication section 15 set a candidate indication to all the remaining tuples to indicate them as candidate tuples. In the rename event corresponding to the Lc, the tuple registered as rename target has set the same value as the time set in the Lc and is excluded from the delete source.

Search criteria for the namespace replication DB 23 is shown below.

```
dbe.m__inode# == event.target.m__inode#
dbe.fname == event.target.fname
```

Tuple delete condition is shown below.

```
dbe.time < event.time − maximum possible time lag
or
(dbe.time < event. time
and dbe.node == event.node)
```

Tuple update content is shown below.

```
dbe.candit = on
```

After that, the namespace replication section 15 branches to step S403 in order to process the next delete pending list element.

The namespace replication section 15 then determines whether the Ec is any one of a file operation event of creation type (create event), file operation event of file new name assignation type (link event), and file information event (getstat event) (S409). In the case that the Ec is any one of the above events (Y in S409), the namespace replication section 15 branches to step S414. If the Ec is not any one of them (N in S409), and in the case where the Ec is a file operation event of name change type (rename event) or file operation event of delete type (delete event), the namespace replication section 15 copies the content of the corresponding event data to the delete pending list element newly allotted on a memory and links it to the end of the delete pending list (S410). Further, in the case where the Ec is the file operation event of file name change type, the namespace replication section 15 uses the inode number set in the Ec to search the namespace replication DB 23 and deletes all the (candidate) tuples inconsistent with the content of Ec (S411).

Search criteria for the namespace replication DB 23 is shown below.

```
dbe.inode# == event.inode#
```

Inconsistent tuple delete condition is shown below.

```
(dbe.time < event.time − possible maximum time lag)
and (dbe.ftype ! = event.ftype
or (event.ftype == dir
and (dbe.m__inode# ! = event.m__inode#
or dbe.fname ! = event.fname)))
```

In the case where the Ec is the file operation event of file name change type (rename event), the namespace replication section 15 searches for a tuple whose inode number, rename target parent inode number, and rename target file name completely matches those set in the Ec in the namespace replication DB 23. If there is no tuple that satisfies the above condition, the namespace replication section 15 registers a new tuple. In the case where there is any tuple that satisfies the above condition and the tuple has the same type, the namespace replication section 15 modifies the content of the tuple. When updating the tuple makes the final creation node indefinite, NULL is set as a creation node to prevent the tuple from being deleted due to the order of occurrence of file operation events on a single node. In the case where there is any inconsistent tuples, any tuple that satisfies the above condition and the tuple has a different type, the namespace replication section 15 deletes only the inconsistent tuples having creation time earlier than the file operation event by more than the maximum possible time lag (S412).

Search criteria for the namespace replication DB 23 is shown below.

```
dbe.inode# == event.inode#
dbe.m__inode# == event.target.m__inode#
dbe.fname == event.target.fname
```

New tuple registration condition is shown below.

```
Corresponding tuple is not found,
or when tuple is found, dbe.ftype ! = event.ftype
```

The content of a new tuple to be registered is shown below. However, if the following new tuple registration condition is satisfied, the namespace replication section 15 does not register a new tuple in the case where the selective file information acquisition option is effective, unless the indication "information acquisition completion state" is set for the corresponding parent directory. That is, in the case where the selective file information acquisition option is effective, only when any tuple that satisfies the condition: (dbe.active==on, dbe.inode#==event.target.m_inode#) has been registered in the namespace replication section DB 23, the namespace replication section 15 registers a new tuple.

```
dbe.m__inode# = event.target.m__inode#
dbe.ftype = event.ftype
dbe.fname = event.target.fname
dbe.inode# = event.inode#
dbe.time = event.time
dbe.candit = off
dbe.node# = event.node#
```

Registered inconsistent tuple delete condition is shown below.

```
dbe.ftype ! = event.ftype
and (dbe.time < event.time − maximum possible time lag)
```

Registered tuple update condition is shown below.

```
dbe.ftype == event.ftype
```

Registered tuple update content is shown below.

```
dbe.node# = NULL
```

(in the case where dbe.node# !=event.node# and dbe.time>=event.time−maximum possible time lag)

```
dbe.node# = event.node#
(in the case where dbe.node# == event.node# or dbe.time <
event.time − maximum possible time lag)
dbe.time = event.time
```

After that, the namespace replication section 15 branches to step S401 in order to process the next event.

When the EC is any one of the file operation event of create type, the file operation event of file new name assignation type, and the file information event (S409,Y), the namespace replication section 15 then uses the inode number set in the Ec to search the namespace replication DB 23 and deletes all the tuples inconsistent with the Ec from the founded tuples. Further, when there is any tuple having a parent inode number, file name, and type completely match counterpart set in the Ec, the namespace replication section 15 updates the relevant tuple. When there is no tuple that satisfies the above condition, the namespace replication section 15 registers a new tuple (S414).

Search criteria for the namespace replication DB 23 is shown below.

```
dbe.inode# == event.inode#
```

Registered inconsistent tuple delete condition is shown below.

```
(dbe.ftype ! = event.ftype and dbe.time < event.time − maximum
possible time lag)
or
(event.ftype == dir and dbe.m__inode # ! = event.m__inode#
and dbe.time < event.time − maximum possible time lag)
```

New tuple registration condition is shown below.

All the tuples that have been found in the search satisfy the following condition.

```
dbe.m_inode# ! = event.m_inode#
or dbe.fname ! = event.fname
or dbe.ftype ! = event.ftype
```

However, if the following new tuple registration condition is satisfied, the namespace replication section 15 does not register a new tuple in the case where the selective file information acquisition option is effective, unless the indication "information acquisition completion state" is set for the corresponding parent directory. That is, in the case where the selective file information acquisition option is effective, only when any tuple that satisfies the condition: (dbe.active=on and dbe.inode#==event.target.m_inode#) has been registered in the namespace replication section DB 23, the namespace replication section 15 registers a new tuple.

The content of new tuple to be registered is shown below.

```
dbe.m_inode# = event.m_inode#
dbe.ftype = event.ftype
dbe.fname = event.fname
dbe.inode# = event.inode#
dbe.attr = event.attr
dbe.time = event.time
dbe.candit =off
dbe.node# = event.node# (in the case where event.type ! = getstat)
dbe.node# = NULL (in the case where event.type == getstat)
dbe.active = on
```

Registered tuple update condition is shown below.

```
dbe.m_inode# == event.m_inode#
and dbe.ftype == event.ftype
and dbe.fname == event.fname
```

Registered tuple update content is shown below.

```
dbe.node# = NULL (in the case where dbe.node# ! = event.node# and
dbe.time >=
event.time – maximum possible time lag)
dbe.node# = event.node# (in the case where dbe.time < event.time –
maximum possible time lag)
dbe.time = event.time
dbe.active = on
```

After that, the namespace replication section 15 branches to step S401 in order to process the next event.

The namespace replication section 15 then finds, on the namespace replication DB 23, a directory whose information has not been acquired, sets the found directory as a root to perform file information acquisition processing (more specifically, iterates searches for the parent inode# of candidate tuples from the namespace replication DB 23 until it reaches "/" and generates a pathname by combining collected file names and sends the obtained pathname to the file information acquisition processing), and performs file operation event reflection processing (S416). In the case where the selective file information option is effective, the namespace replication section 15 applies the file information acquisition processing only to the directories whose information has not been acquired and for the parent directory of which the "indication information acquisition completion state" has been set.

After determining that there is no directory whose information has not been acquired, the namespace replication section 15 sequentially checks candidate tuples by inquiring of the file system 3 for the existence of the corresponding files and deletes files that do not actually exist. For the tuple corresponding to a file that actually exists, the namespace replication section 15 removes the candidate indication (S417). More specifically, the namespace replication section 15 iterates searches for the parent inode# of the candidate tuples from the namespace replication DB 23, until reaching to "/", and generates pathnames combining collected file name, and sends the obtained pathname to the file system 3 to make an inquiry therewith. When finding a tuple corresponding to pathname other than a directory or finding no tuple corresponding to the obtained pathname in the course of combining pathnames, the namespace replication section 15 determines that the corresponding file does not actually exist and deletes the corresponding candidate tuple. In the case where the namespace replication section 15 cannot confirm the existence of a directory in the middle of a path and therefore cannot follow the path up to the end as a result of the inquiry with the file system 3, there is a possibility that the name of the directory in the middle of the path has been changed by the rename operation during processing. In this case, it is necessary to reflect accumulated file operation events on the namespace replication DB 23 again, so that the namespace replication section 15 adds an indication "recheck" to the internal variable and branches to processing of the next candidate tuple.

When completing processing of all the candidate tuples, the namespace replication section 15 checks whether "recheck" indication is set or not (S418). When determining that "recheck" indication is set (Y in S418), the namespace replication section 15 branches to S401 and reflects again file operation events occurring during this process flow on the namespace replication DB 23. When determining that "recheck" indication is not set (N in S418), the namespace replication section 15 ends this flow.

Next, the namespace replication processing performed in the case where the generation number cannot be used (in the case of a file system that reuses a released inode number immediately after the release thereof) will be described.

Although the namespace replication processing performed in this case is almost the same as that performed in the case where the generation number is available, the following point is different therefrom. When a file operation event of delete type and file operation event of creation type for the same inode competes with each other within the maximum possible time lag period, the namespace replication section 15 does not apply the delete type but lefts only the creation type and keeps the candidate indication attached thereto. More specifically, step S405 in the above process flow is modified as follows.

In the case where the Lc is a copy of a file operation event of delete type, the namespace replication section 15 uses the inode number set in the Lc to search the namespace replication DB 23. The namespace replication section 15 then finds corresponding tuples and, among them, deletes all the tuples that satisfy the following condition. The condition is: the parent inode number and file name correspond to those set in the Lc; and event time set in the found tuple is smaller than (time set in the delete pending element–maximum possible time lag). The namespace replication section 15 sets the candidate indication for the tuples that cannot be deleted because the event time thereof is not smaller than (time set in the delete pending element−maximum possible time lag) although the parent inode number and file name thereof correspond to those set in the Lc.

Search criteria for the namespace replication DB 23 is shown below.

---
dbe.inode# == event.inode#
---

Registered tuple delete condition is shown below.

---
(dbe.m__inode# == event.m__inode# and dbe.fname == event.fname and (dbe.time < event.time − maximum possible time lag or dbe.node# == event.node# and dbe.time == event.time))
or
(dbe.ftype ! = event.ftype and dbe.time < event.time − maximum possible time lag)
or
(event.ftype == dir and dbe.time < event.time − maximum possible time lag)
---

Registered tuple update condition is shown below.

---
dbe.m__inode# == event.m__node and dbe.fname == event.fname and dbe.time >=
event.time − maximum possible time lag and dbe.node# ! = event.node#
---

Registered tuple update content is shown below.

---
dbe.candit = on
---

The namespace replication section 15 performs the above processing while regarding an event not including the generation number as an event to which generation number 0 is added.

Next, file data restore processing and file system switch processing performed by the file data restore section 16 will be described.

Figure 9:
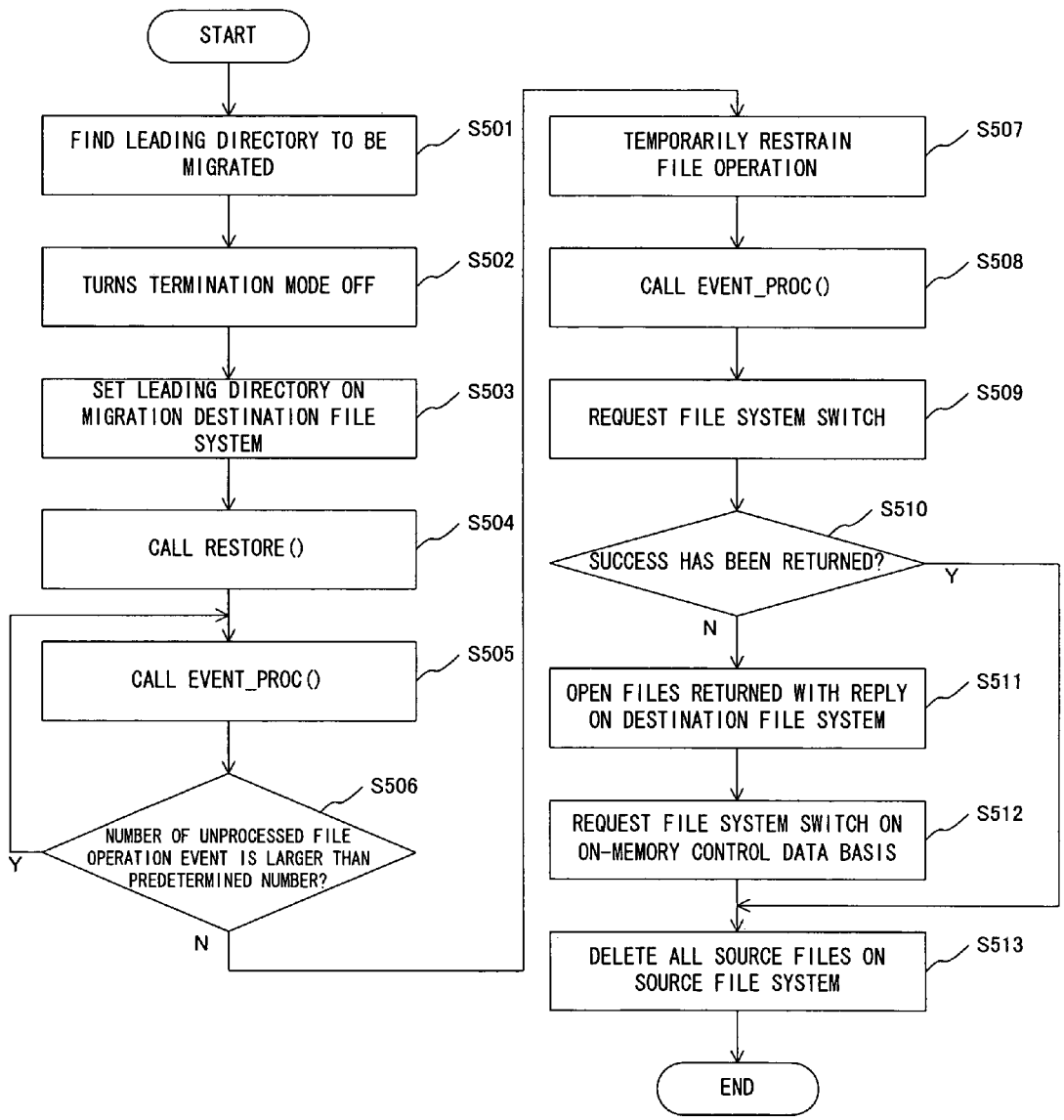
FIG. 9 is a flowchart showing an example of file data restore processing and file system switch processing according to the present invention.

The file data restore section 16 restores data of the source file system to the destination file system 4 based on the namespace of the namespace replication DB 23 created by the namespace replication section 15. After that, the file data restore section 16 instructs the file system switch section 17 to perform file system switch processing. FIG. 9 is a flowchart showing an example of the file data restore processing and file system switch processing according to the present invention.

Firstly, as the file data restore processing, the file data restore section 16 finds a tuple (top_dbe_entry) in the namespace replication DB 23 that indicates the top directory in the hierarchy to be migrated according to a specified path (S501). More specifically, the file data restore section 16 uses the parent inode number as a key to sequentially search for tuples holding file names constituting a path name according to the entry order. Then, the file data restore section 16 turns a termination mode off (S502). The termination mode is a mode for temporarily suspending the file system switch processing as well as file operation. The file data restore section 16 then creates a top directory on the destination file system 4, sets attribute information to the created directory (S503), and sets an indication "data being restored" to top_dbe_entry. The file data restore section 16 then calls a recursive function restore ( ) with top_dbe_entry set as an argument (target_dbe_entry) in order to process the namespace below the top_dbe_entry (S504). The file data restore section 16 then calls event_proc( ) in order to reflect a file operation event occurring during processing of the function restore( ) or event_proc( ) on the destination file system 4 (S505).

The file data restore section 16 then determines whether the number of unprocessed file operation events is larger than a predetermined number (S506). When determining that the number of unprocessed file operation events is larger than the threshold Y in S506), the file data restore section 16 returns to step S505.

On the other hand, when determining that the number of unprocessed file operation events is not larger than the threshold (N in S506), the file data restore section 16 turns the termination mode on and performs the file system switch processing as follows.

Firstly, the file data restore section 16 calls the file system switch section 17 and temporarily blocks file operation from an application program (S507). In response to this, the file system switch section 17 suspends a file access request issued from an application program until a switch instruction has been issued. More specifically, when receiving an access request from the application, the application section 12 waits until an indication of the file operation suspension has been canceled in the filter driver.

The file data restore section 16 then calls event_proc( ) to reflect unprocessed file operation events on the destination file system in a synchronized manner (S508). At the time point when the synchronized reflection on the destination file system has been completed, the file data restore section 16 calls the file system switch section 17 and requests it to switch the file system and cancel the temporary suspension of file access (S509). In response to the above request, the file system switch section 17 flushes all cache data in the file system to invalidate all caches. After that, the file system switch section 17 sets link information pointing to the destination file system to a specified directory in the source file system, instructs the file operation acquisition section to terminate the event output, sets an indication indicating the cancel of the temporary suspension of file access, and returns back to the file data restore section 16 with success return code. In the case where it is necessary to switch a control table on a memory due to existence of an open file besides the cache flush processing, the file system switch section 17 returns to the file data restore section 16 with a error code including a list of inode number representing files being opened. In this case, file system switch section 17 bypass cancel processing of the temporary suspension.

The file data restore section 16 then determines whether success code has been returned or not (S510). When determining that success has been returned (Y in S510), the file data restore section 16 branches to step S513.

On the other hand, in the case where failure code is returned as a reply of the request of file system switch issued from the file data restore section 16 because the file system switch cannot be made only by the invalidation of caches due to the existence of an open file (N in S510), the file data restore section 16 finds a tuple corresponding to the inode number which has been included in the error code on the namespace replication DB 23 and determines whether the tuple is included in the migration source region. In the case where dbe.inrestore is on, it means that the corresponding tuple represents a member file of the migration source region. The file data restore section 16 gets the path name of a source file specified by the inode number list replied with error code using the namespace replication DB 23 on the source file system and opens a corresponding destination file on the destination file system 4 (S511). Then, the file data restore section 16 calls the file system switch section 17 with a list of triplet, each triplet consisting of source inode number, destination inode number, and destination open information, as argument and requests it to perform file system switch on the control data basis (S512). In response to the above request, the file system switch section 17 forcibly switches on-memory file system's control data representing opened files which have been specified by an input argument from the source file system 3 to the destination file system 4 and, after that, sets link information and cancels the temporary suspension of file access.

After completion of the switch processing to the destination file system 4, the source files as well as corresponding namespace are deleted from the source file system 3 (S513) and this flow is ended.

Processing of the recursive function restore (target_dbe_entry) will be described below.

FIG. 10 is a flowchart showing an example of operation of restore( ) according to the present invention. Firstly, the restore( ) searches for a child tuple (daughter_dbe_entry) having an argument source_dbe_entry as a parent from the namespace replication DB 23 (S601). Search criteria for the namespace replication DB 23 used at this time is shown below.

---
target_dbe_entry.inode# == daughter_dbe_entry.m_inode#
---

The restore( ) then repeatedly performs processing for the obtained daughter_dbe_entry as follows.

The restore( ) determines indication "data being restored" has already been set to the next daughter_dbe_entry (S603). When determining that indication "data being restored" has already been set (Y in S603), the restore( ) determines whether a garbage file name is set to daughter_dbe_entry, that is, garbage marking is attached thereto (S611). When determining that the garbage file name is set (Y in S611), the restore( ) changes the file name from the garbage file name to an original file name in the corresponding tuple on the destination file system 4 and resets the garbage marking in the tuple. After that, the restore( ) branches to step S610. When determining that the garbage marking is not attached (N in S611), the restore( ) directly branches to step S610.

On the other hand, when determining that indication "data being restored" has not been set (N in S603), the restore( ) creates a file or directory corresponding to daughter_dbe_entry on the destination file system 4 (S604). The restore( ) then sets indication "data being restored" to daughter_dbe_entry (S605).

---
daughter_dbe_entry.inrestore = on
---

The restore( ) then determines whether daughter_dbe_entry indicates a file (S606). When determining that daughter_dbe_entry indicates a file (Y in S606), the restore( ) sets current time to daughter_dbe_entry as data migration completion time.

---
daughter_dbe_entry.cmptime = current time
---

The restore( ) then reads data on the source file system 3 from the start and copies the read data to a file on the destination file system 4 (S607).

When determining that daughter_dbe_entry indicates a directory (N in S606), the restore( ) passes daughter_dbe_entry to the function restore( ) to recursively performs processing (S608).

The restore( ) determines whether all daughter_dbe_entry have been processed (S610). When determining that all daughter_dbe_entry have been processed (Y in S610), the restore ( ) returns to the caller and ends this flow. Otherwise (N in S610), returns to step S601 and continues processing.

Processing of event_proc( ) will be described.

The event_proc( ) processes a file operation event occurring during the file data restore processing to correct data being created on the destination file system 4 and reflect the file operation event on the namespace replication DB 23.

The event_proc( ) processes the file operation events according to the same method as that used in the namespace replication processing. In this phase, however, there exists no file information event and therefore, only the order of occurrence between the file operation events is determined. Further, in the case where the tuple on the namespace replication DB 23 to which the indication "data being restored" is set is deleted, delete of the corresponding data (remove or rmdir) on the destination file system 4 is performed at the same time. Further, in the case where the file name of the tuple on the namespace replication DB 23 to which the indication "data being restored" is set is changed and thereby the corresponding data is excluded from the migration source (in this case, the indication "data being restored" is not set to the tuple indicating the destination parent inode number), a unique file name is created and set as garbage name of the tuple, and the name of the file that has been created on the destination file system is changed to a file with a garbage name on a garbage directory on the destination file system.

The garbage marking is indicated by dbe.garbage and a garbage name is set in this area. The garbage name is initialized by NULL when a tuple is newly registered. A unique garbage name is set at the time point when the event_proc( ) recognizes that name change has been made to cause some migration source data to be excluded from the migration source.

In the case where the file name of the tuple on the namespace replication DB 23 to which the indication "data being restored" is not set is changed and thereby the corresponding data is included in the migration source (in this case, the indication "data being restored" is set to the tuple indicating the destination parent inode number), the restore( ) is called and thereby data below the corresponding directory is reflected on the source file system. When a directory or file with a garbage name, which has been once excluded from the migration source is restored to the migration source as a result of the above reflection processing, event_proc( ), using a rename operation, restores the target file of data below the migration target directory from the garbage directory on the destination file system and set dbe.garbage of the corresponding tuple back to NULL (S611).

In the case where a file write event corresponding to the tuple to which the indication "data is being restored" is set is found and a difference between data migration completion time (dbe.cmptime) and event time (event.time) falls within the maximum possible time lag or event time is greater than the data migration completion time, data in the area that is indicated by the event is read from the source file system and is written to the destination file system. After that, the data migration completion time is updated. In the case where the event time is smaller than (data migration completion time−maximum possible time lag), it means that the area indicated by the file write event has already been copied to the destination file system and can therefore be ignored. In the case where the order of occurrence of different file operation events can be determined, the maximum possible time lag is regarded as 0.

In the case where the selective file information acquisition option is effective, when the event_proc( ) recognizes that the source file is excluded from the migration target or conversely, the file out of migration target is included in the migration target, it is regarded as an error and file data restore processing is ended after required resource release has been made.

Further, it is possible to provide a program that allows a computer constituting the file management apparatus to execute the above steps as a file management program. By storing the above program in a computer-readable storage medium, it is possible to allow the computer constituting the file management apparatus to execute the program. The computer-readable storage medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

The file information acquisition processing in the embodiment corresponds to a file information retrieve step; file operation acquisition processing in the embodiment corresponds to a file operation trace step; file data restore processing in the embodiment corresponds to a file data replication step; file information acquisition section in the embodiment corresponds to a file information retrieve section; file operation acquisition section in the embodiment corresponds to a file operation trace section; file data restore section in the embodiment corresponds to a file data replication section; source file system in the embodiment corresponds to a source file system; and destination file system in the embodiment corresponds to a destination file system.

What is claimed is:

1. A computer-readable medium having stored thereon a file management program causing computer connected to a plurality of file systems to execute a process comprising:
   acquiring file information events indicating file information of source files including names and attributes thereof on a source file system included in the plurality of file systems and recording the file information events, respectively, upon search of each of the source files;
   acquiring file operation events indicating information of each of file operations made for the source files and recording the file operation events, respectively, each time each of the file operations is made;
   generating, based on the file information events and the file operation events, a namespace replication database in which namespace of the source files has been replicated logically, in asynchrony with and after processing of the file operations in a collective manner;
   setting a directory on a destination file system included in the plurality of the file systems based on the namespace replication database and replicating data of the source files from the source file system to the destination file system independently of the processing of file operation requests made to the source file system;
   determining whether or not an acquisition time is set to each of the file information events and the file operation events by the source file system;
   determining a sequence of the file information events and the file operation events based on the acquisition time for each of the file information events and the file operation events when it is determined that an acquisition time is set to each of the file information events and the file operation events;
   determining whether or not the plurality of file systems are used by a single information processing apparatus when it is determined that an acquisition time is not set to each of the file information events and the file operation events;
   setting an acquisition time to each of the file information events in response to acquisition of the file information events when it is determined that the plurality of file systems are used by a single information processing apparatus;
   setting an acquisition time to each of the file operation events in response to acquisition of the file operation events when it is determined that the plurality of file systems are used by a single information processing apparatus;
   determining a sequence of the file information events and the file operation events based on the acquisition time to each of the file information events in response to acquisition of the file information events, the acquisition time to each of the file operation events in response to acquisition of the file operation events, and a predetermined time lag;
   reflecting contents of the file operation events on contents of the file information events in the namespace replication database, respectively, according to the sequence of the file information events and the file operation events;
   generating a candidate of one of a file and a directory in the namespace replication database when it is determined that the plurality of file systems are not used by a single information processing apparatus, the one of a file and a directory having possibility of generation in the file operation events; and
   confirming presence or absence of the candidate by referring to the file information events and the file operation events so as to reflect a result of confirmation of the candidate in the namespace replication database.

2. The computer readable medium according to claim 1, wherein the process further comprises:
   reflecting unprocessed file operation events on the destination file system; and
   switching between the source file system and the destination file system on the plurality of file systems when an amount of the unprocessed file operation events is less than a predetermined amount.

3. The computer readable medium according to claim 1, wherein the process further comprises:
   switching an access made to the source files on the source file system to an access made to the source files on the destination file system after replication of the data of the file systems.

4. The computer readable medium according to claim 3, wherein the process further comprises:
   blocking a file access, reflecting unprocessed file operation events on the destination file system, setting link information to the destination file system, and canceling the blocking of file access after completion of the file system switch.

5. The file computer readable medium according to claim 1, wherein
   the acquiring of file information events follows a hierarchical structure of a directory on the source file system in the ascending or descending order in terms of path names and records file information including the names and attributes of the source files.

6. A file management method that applied to a computer connected to a plurality of file systems, the method comprising:
acquiring file information events indicating file information of source files including names and attributes thereof on a source file system included in the plurality of file systems and recording the file information events, respectively, upon search of each of the source files;
acquiring file operation events indicating information of each of file operations made for the source files and recording the file operation events, respectively, each time each of the file operations is made;
generating, based on the file information events and the file operation events, a namespace replication database in which namespace of the source files has been replicated logically, in asynchrony with and after processing of the file operations in a collective manner;
setting a directory on a destination file system based on the namespace replication database and replicating data of the source files from the source file system to the destination file system independently of the processing of file operation requests made to the source file system;
determining whether or not an acquisition time is set to each of the file information events and the file operation events by the source file system;
determining a sequence of the file information events and the file operation events based on the acquisition time for each of the file information events and the file operation events when it is determined that an acquisition time is set to each of the file information events and the file operation events;
determining whether or not the plurality of file systems are used by a single information processing apparatus when it is determined that an acquisition time is not set to each of the file information events and the file operation events;
setting an acquisition time to each of the file information events in response to acquisition of the file information events when it is determined that the plurality of file systems are used by a single information processing apparatus;
setting an acquisition time to each of the file operation events in response to acquisition of the file operation events when it is determined that the plurality of file systems are used by a single information processing apparatus;
determining a sequence of the file information events and the file operation events based on the acquisition time to each of the file information events in response to acquisition of the file information events, the acquisition time to each of the file operation events in response to acquisition of the file operation events, and a predetermined time lag;
reflecting contents of the file operation events on contents of the file information events in the namespace replication database, respectively, according to the sequence of the file information events and the file operation events;
generating a candidate of one of a file and a directory in the namespace replication database when it is determined that the plurality of file systems are not used by a single information processing apparatus, the one of a file and a directory having possibility of generation in the file operation events; and
confirming presence or absence of the candidate by referring to the file information events and the file operation events so as to reflect a result of confirmation of the candidate in the namespace replication database.

7. The file management method according to claim 6, further comprising:
switching an access made to the source files on the source file system to an access made to the source files on the destination file system after replication of the data of the systems.

\* \* \* \* \*

UNITED STATES PATENT AND TRADEMARK OFFICE
CERTIFICATE OF CORRECTION

PATENT NO. : 7,680,846 B2 Page 1 of 1
APPLICATION NO. : 11/344162
DATED : March 16, 2010
INVENTOR(S) : Yoshitake Shinkai It is certified that error appears in the above-identified patent and that said Letters Patent is hereby corrected as shown below:

Title Page, item (54), Line 2, after "APPARATUS" insert --,--.

Column 1, Line 2, after "APPARATUS" insert --,--.

Column 31, Line 43, after "causing" insert --a--.

Column 32, Line 64, after "The" delete "file".

Signed and Sealed this

Eighth Day of June, 2010

David J. Kappos
*Director of the United States Patent and Trademark Office*